United States Patent [19]
Laithwaite et al.

[11] Patent Number: 5,860,317
[45] Date of Patent: Jan. 19, 1999

[54] PROPULSION SYSTEM

[75] Inventors: Eric Laithwaite, Bognor Regis; William Dawson, Burgess Hill, both of United Kingdom

[73] Assignee: Gyron Limited, West Sussex, United Kingdom

[21] Appl. No.: 737,164

[22] PCT Filed: May 5, 1995

[86] PCT No.: PCT/GB95/01027

§ 371 Date: Nov. 5, 1996

§ 102(e) Date: Nov. 5, 1996

[87] PCT Pub. No.: WO95/30832

PCT Pub. Date: Nov. 16, 1995

[30] Foreign Application Priority Data

May 5, 1994 [GB] United Kingdom .................. 9408982

[51] Int. Cl.$^6$ .............................. G01C 19/02; F03G 3/08
[52] U.S. Cl. ........................................... 74/5.34; 74/84 S
[58] Field of Search .................................. 74/5.34, 5.37, 74/5.22, 84 R, 84 S

[56] References Cited

U.S. PATENT DOCUMENTS 5,335,561  8/1994  Harvey ..................................... 74/84 R

FOREIGN PATENT DOCUMENTS

| 2 293 608 | 7/1976 | France . | |
|---|---|---|---|
| 23 41 245 | 5/1975 | Germany . | |
| 35 23 160 | 1/1987 | Germany | 74/5.34 |
| 60-56182 | 4/1985 | Japan | 74/5.34 |
| 2 090 404 | 7/1982 | United Kingdom | 74/5.34 |
| 2 207 753 | 2/1989 | United Kingdom . | |
| 2 209 832 | 5/1989 | United Kingdom | 74/5.37 |
| WO 91/02155 | 2/1991 | WIPO . | |

*Primary Examiner*—Rodney H. Bonck
*Attorney, Agent, or Firm*—Nixon & Vanderhye

[57] ABSTRACT

A propulsion and positioning system for a vehicle comprises a first gyroscope mounted for precession about an axis remote from the center of said gyroscope. A support structure connects the gyroscope to the vehicle. Gyroscopes are used to cause the first gyroscope to follow a path which involves at least one precession-dominated portion and at least one translation-dominated portion, wherein in the precession-dominated portion, the mass of the first gyroscope is transferred and associated movement of the mass of the remainder of the system in a given direction occurs, and, in the translation-dominated portion, the mass of the first gyroscope moves with an associated second movement of the mass of the remainder of the system in substantially the opposite direction, wherein the movement owing to the translation-dominated portion and is larger than the movement owing to the precession-dominated portion of the motion, hence moving the system.

18 Claims, 23 Drawing Sheets

For clarity the subsequent positions of B, C, D and E are shown displaced vertically with respect to A For clarity the subsequent positions of B, C, D and E are shown displaced vertically with respect to A

PROPULSION SYSTEM

BACKGROUND OF THE INVENTION

The present invention relates to a propulsion system for a vehicle. It has particular utility in the propulsion and/or positioning of space vehicles.

The majority of propulsion systems in use today rely either on exerting forces against the surface over which they travel (e.g. cars, trains, funiculars (via their supporting rope) etc.), accelerating material which comprises the medium through which they travel in a direction opposite to the direction in which they are being propelled (e.g. propeller aircraft, power driven or manually propelled boats), taking advantage of thermally or gravitationally derived energy gradients (e.g. sailing boats, gliders or surf boards) or ejecting material in the form of fuel carried by the vehicle, either in part as in the case of a jet engine or totally as in the case of a rocket engine. Hitherto, there has been no alternative but to employ the latter method in order to propel or position a vehicle in space.

A problem associated with propulsion systems utilising the latter method is that the volatile fuel required to be carried by the vehicle represents a danger to any crew in the vehicle, the vehicle itself and its contents.

Another problem associated with such propulsion systems is that the range and manoeuverability of the vehicle is limited by the amount of fuel carried.

Yet another problem associated with such systems is that once the vehicle is accelerated, it can only be decelerated by expending further fuel.

The invention may also have utility in specialised terrestrial applications. For example, much effort has been expended in attempting to quieten the propulsion systems of boats. By obviating the need for propellers or such like, the system according to the present invention may provide quieter propulsion than has hitherto been possible.

The principles underlying the present invention will now be explained with reference to and as illustrated in FIGS. 1–9 of the accompanying drawings in which:

One method of moving a space vehicle a short distance is illustrated in FIG. 1. A device (D) inside the vehicle is arranged to project or move an object (W), of significant mass in relation to the mass of the remainder of the vehicle from one end of the vehicle to a receptacle (B) at the other end. It is known that if the object (W) is so projected to the right in FIG. 1, the vehicle will move a distance to the left (to the position S) in FIG. 1. After that movement, the object (W) and the receptacle (B) are at the positions W' and B' respectively. The distance moved will approach the length of the vehicle if the mass of the object (W) is relatively large in comparison to the mass of the vehicle, or will approach zero if the mass of the object (W) is insignificant in comparison to the mass of the vehicle. In any case, the effect will be that the centre of mass of the vehicle and object will not move. For this reason, it is thought that such an activity is of little or no use in propelling a vehicle, since it is assumed that, in returning the object (W), the vehicle will necessarily undergo an equal and opposite displacement to that which it underwent when the mass was originally moved from one end of the vehicle to the other.

Another method of moving a vehicle a short distance is schematically illustrated in FIG. 2. FIG. 2 shows a vehicle (1), on which is mounted a base plate (2), which in turn carries a pivot (O). An arm OA of length R is mounted with one end on pivot (O) and the opposite end carries an object (W) of mass M.

If a force were to be applied to the object (W) with the intention of moving its mass M around the semi-circular arc ACB at speed v, it might be thought that the sum of the centrifugal force acting on the pivot (O) during that motion would have components only in the direction Y and therefore that the vehicle would be moved in the direction Y. However, this is not the case because the force needed to give the initial momentum Mv to the object W will always cancel the component of the centrifugal force. In fact, the application of the initial force to the object (W) will result in an equal and opposite force being applied to the vehicle (1) so that the object (W) and the vehicle (1) would rotate in opposite senses about the pivot (O).

The rotary part of this reaction can be neutralized by arranging for a second identical object (W1) arranged as a mirror image of the first object (W) to rotate in the opposite direction as shown in FIG. 3.

Referring to FIG. 3, if the two objects (W1, W2) are of large mass compared to the mass of the vehicle, then it will be seen that as they begin to move around their semi-circular paths they will exert a relatively large centrifugal force (initially towards the right in FIG. 3) on the vehicle (1) which will in turn will be accelerated to a relatively high velocity by this force owing to its relatively low inertia. As the two objects (W1, W2) approach the point B (having passed points C and E), they will then exert similarly large centrifugal forces to the left in FIG. 3 decelerating the vehicle until it returns to the condition it had when the objects (W1, W2) were launched. Hence it will be seen that the motion of the objects (W1, W2) will be accompanied by an associated movement of the vehicle a distance D1 to the right as shown in FIG. 4. The vehicle moves from positions A to E in that Figure.

If, however, the objects (W1, W2) have a relatively low mass compared to the mass of the vehicle then they will exert a relatively small centrifugal force on the vehicle which will only be accelerated to a relatively low velocity owing to its relatively large inertia. When the masses then approach the point B (having passed points C and E), they will exert similarly low centrifugal forces on the vehicle in order to return it to its initial condition. Therefore, it will be seen that if the masses are relatively small (and hence the centrifugal force is less than in the previous paragraph), the vehicle will have moved a smaller distance D2 to the right. The motion of the vehicle in this case is illustrated in FIG. 5. It will be seen that the reduction of centrifugal force results in the vehicle moving a smaller distance. The vehicle moves from position A to position E in that Figure.

Consideration of the above two paragraphs and FIGS. 4 and 5, will show that the larger the relative mass of the objects (W1, W2) to the mass of the vehicle, the larger the displacement of the vehicle will be. If, for example, the vehicle were to be of negligible mass when compared to the sum of the masses of the objects (W1, W2), then the vehicle would move a distance 2R to the right in FIG. 3. If the vehicle were to have a mass equal to the sum of the masses of the objects (W1, W2), then the effect of the centrifugal force would be to move the vehicle a distance R to the right in FIG. 3.

It will be seen that, in each of the above examples, the centre of mass of the combined vehicle and object system remains in the same position.

As stated above, the fact that the centre of the mass of the combined system is not moved in each of the above examples means that such a method cannot be used to move a vehicle a distance greater than its own length.

However, if the centrifugal force exerted by the masses of the objects (W1, W2) as they travelled from position A to position B were to be reduced below the level seen in the examples above for that mass then the vehicle would be moved over a smaller distance. In other words, in a supposed first movement (in which centrifugal force is reduced), the vehicle would move a first (relatively short) distance in a direction opposite to the direction of movement of the masses.

Then, if the objects (W1, W2) were to be subsequently returned, in a second movement in which the centrifugal force was equal to that seen in the above examples, the vehicle would move a second (relatively long) distance in the opposite direction to the first movement. Clearly, after both the first and second movements had taken place the position of the objects (W1, W2) relative to the vehicle would be unchanged. Moreover, it will be seen that the combination of the first and second movements would result in a net movement of the vehicle and its contents in the direction opposite to said first movement. Hence, it will be seen how, if a way could be found of reducing the centrifugal force exerted by the objects (W1, W2) moving from one end of the vehicle to the other that the centre of mass of the combined system could be moved across space, that mass could thereby be transferred, and that the vehicle could be propelled through space.

It is well known that when a spinning gyroscope is mounted on a pivoted radius arm, so that the pivot is remote from the centre of the wheel forming the spinning mass of the gyroscope, and the gyroscope is subjected to a torque at right angles to the spin axis of the wheel (for instance by means of transfer through the radius arm) then the gyroscope precesses, that is rotates, about a precession-axis that is at right angles both to the spin-axis of the wheel and the applied torque provided that it is free to do so.

FIG. 6 shows a plan view of a spinning wheel, all of whose mass may be considered to be concentrated in its rim of negligible thickness and of radius r. The wheel is connected to a pivot (O) (which forms the centre of precession) by a light rod of length R. A torque T is applied to the wheel in the direction shown.

The mechanism of precession may better be understood by considering the highest and lowest points of the rim of the spinning wheel as illustrated in FIGS. 7A and 7B.

From FIGS. 7A and 7B, the application of the torque T may be considered as tantamount to the application of a force F1 to the top point of the spinning wheel and a force F2 to the bottom point of the spinning wheel, deflecting them and causing a change in the direction of their velocities from v to v' as shown. Thus both velocity vectors are deflected clockwise. It will be realized that an object whose velocity is constantly changing in a direction at right angles to its current velocity moves in a circle.

By conventional two-dimensional mechanics, a non-precessing mass moving in a circle only does so if it is subjected to a constantly applied force defined as the 'centripetal' force.

The present inventors realised that by applying oppositely directed forces, (the effect of a torque,) to particles that are themselves, moving in opposite directions as a result of being part of the rim of a spinning wheel they could cause the spinning rim to circle about O without requiring a centripetal force.

It is known that a convenient means (for demonstration purposes) of applying a constant torque to a gyroscope is to offset the gyroscope on a shaft, which is supported at the end remote from the gyroscope by a joint, that allows the shaft to move both laterally and up and down, and to allow the weight of the gyroscope, together with the reaction force at the joint, to be the forces that apply the torque.

It is also known that when the wheel is spun up, suspended and released in this manner the gyroscope will precess at a rate $\Omega$ derived from the equation:

$$\left\{ \begin{array}{c} T = I\Omega\omega \\ \text{OR} \\ MgR = I\Omega\omega \end{array} \right\} \quad (1)$$

Where:
T—MgR—torque at right angles to shaft
M—mass of the wheel
g—acceleration due to gravity
R—length of the shaft
I—moment of inertia of wheel
ω—angular spin velocity of wheel Further, it will precess about any point in the precessional plane so long as it is launched with initial conditions such that it finds itself travelling at the linear tangential velocity R.$\Omega$ where $\Omega$ is determined from equation (1) inserting the value for the torque that so obtains.

With reference to FIG. 8, the present inventors realised that if two gyroscopes of identical mass M and spinning at the same speed ω, but in opposite directions to one another, were mounted on equal rods with their remote ends pivoted in a frame (0,0') of negligible weight which was itself unrestrained, and were launched in an arc from A to B by whatever means (P), be it a spring, motor, ramp or chemical reaction, in such a way that, at the moment they found themselves being acted on by gravity supplying the torque, their launch velocity was exactly R.$\Omega$ where:

$$\Omega = \frac{M.g.R.}{I\omega}$$

then the resulting motion (in the event of the gyroscopes being 'perfect' (see below)), would not involve a centrifugal force being exerted on the frame (0,0'), that the frame would not therefore be deflected and that the centre of mass of the system would move a total distance of 2R.

It will be appreciated that if the wheels were not spinning and were then just 'dead' masses and were given the same treatment (as far as that is possible given that they would then have NO TENDENCY to move of their own volition when subjected to a torque and would therefore have to be projected with considerable velocity to achieve a similar result), then the frame (0,0') would, (as explained with reference to FIG. 3), be deflected from a distance R from one side of the wheels to a distance R on the other side. The centre of mass of the system would not move.

The present inventors have conducted experiments which show that when a gyroscope is caused to precess by a torque whatever additional angular momentum it acquires combines with the angular momentum already in the spinning mass and if the axis about which it is caused to precess is remote from the centre of the wheel, that an additional linear momentum proportional to the linear tangential velocity of the total moving mass of the gyroscope about that said axis of precession is the only extra dynamic requirement. The experiments conducted further show that, once the gyroscope has been launched on its path of precession about a remote axis as described, the forces exerted by the gyroscope at that axis are largely those involved with application of torque to the gyroscope. Such forces that pass through the axis normal to the tangent at any point in the precessional path of the gyroscope are less than those calculated from the conventional formulae for derivation of centrifugal force of a non-precessing mass. Thus it follows that, provided it is correctly launched, the centre of mass of a gyroscope may be moved around a circle of precession from the one end of a diameter to the other without the full corresponding net force at the centre of precession.

The present inventors further realised that if the mass of the gyroscope could be transferred predominantly by a precession of the gyroscope without a substantial movement in the vehicle, (i.e. providing the first movement referred to above) and thereafter the mass of the gyroscope were to be returned to its original position in relation to the vehicle by means not involving precession (deriving the momentum for that movement from the remainder of the system) (i.e. providing the larger second movement referred to above), then the vehicle would be moved and if this cycle were to be repeated the vehicle would be propelled.

It is arranged that in the precessional motion of FIG. 8, the gyroscopes derive their momentum from each other.

According to a first aspect of the present invention there is provided a method of moving a vehicle in a first direction, which method comprises the steps of : connecting at least one gyrocope means to said vehicle; causing said gyroscope means to follow a path which involves at least one precession-dominated portion and at least one translation-dominated portion, wherein in the precession-dominated portion, the mass of the gyroscope means moves in said first direction and an associated first movement of the vehicle in substantially the opposite direction to said first direction occurs, and, in the translation-dominated portion, the mass of the gyroscope means moves with an associated second movement of the mass of the vehicle in substantially said first direction, wherein said second movement is greater than said first movement and hence the vehicle moves in said first direction.

According to a second aspect of the present invention there is provided an apparatus for propelling a vehicle in a first direction, which apparatus comprises:

at least one gyroscope means adapted for precessional motion about an axis remote from the centre of said gyroscope means; means for causing the gyroscope means to follow a path which involves at least one precession-dominated portion and at least one translation-dominated portion, wherein in the precession-dominated portion, the mass of the gyroscope means moves in said first direction with an associated first movement of the vehicle in substantially the opposite direction to said first direction, and, in the translation-dominated portion, the mass of the gyroscope means is moved with an associated second movement of the vehicle in substantially said first direction; and wherein said second movement is greater than said first movement and hence the vehicle moves in said first direction.

Furthermore, the present inventors have conducted experiments which show that if the mass of the wheel of the gyroscope is not concentrated at an infinitely thin rim then an amount of centripetal force is developed which is required to constrain all parts to a circle, or precess, about the same centre 0. However, these experiments have verified that the centripetal force is still less than that predicted by the conventional formula for non-precessing masses.

The practical situation that would thereby be obtained is illustrated in FIG. 9. The gyroscopes would, as a result of their not being 'perfect', exert some centripetal force on the frame (0,0'). The frame would be moved a distance to the right as shown in that Figure, so that by the time the frame (0,0'), had moved from S to T, the gyroscopes have moved to Q and Q' respectively. However, when the gyroscopes are subsequently returned to the right hand side of the frame, the frame will be displaced by a distance 2R to the left in FIG. 9. Therefore, the combined result of the precessional motion and the translational motion would be to move the frame from position S to position U, i.e. over a distance less than the distance 2R obtained in the perfect case of FIG. 8 but nevertheless with a resulting movement in the centre of mass of the system that would not be achieved with 'dead' masses.

Advantageously then, a high proportion of the mass of the gyroscope means lies in a plane at right angles to the spin axis of said gyroscope means and is located at a predetermined distance from said spin axis of the gyroscope.

Other experiments have shown that the greater the wheel spin velocity $\omega$ is in relation to the precessional velocity $\Omega$, the less centripetal force is developed. $\Omega$ and $\omega$ are related to the applied torque T and the moment of inertia I of the wheel by equation (1).

Preferably, the ratio of the angular velocity of the gyroscope means about its spin axis to the angular velocity of said precession is maximised.

In the absence of a gravitational field the torque to cause the gyroscope to precess in the first place has to be provided. This may conveniently be obtained from an identical gyroscope spinning in the opposite direction and with the same angular velocity as the gyroscope against which it is to be reacted so that the torque being applied to one gyroscope is equal and opposite to the torque on the other gyroscope, the net torque on the vehicle is nil and the two gyroscopes then precess in the same direction, as a pair, about a centre.

Preferably therefore, the apparatus comprises at least first and second gyroscope means such that the torque required for the precession of the first gyroscope means is provided by the second gyroscope means.

In order for this first pair of gyroscopes to precess about a centre remote from the centre of the gyroscopes, they must, as previously stated, be given a linear momentum proportional to their prospective linear tangential velocity when subjected to the applied torque. In a preferred embodiment of the invention this linear momentum may conveniently be derived from an identical pair of gyroscopes with identical attributes arranged as a mirror image of the first pair. In this arrangement the linear momentum required to launch each pair of gyroscopes on their precessional paths are equal and opposite and cancel out so that the net momentum outside the system is nil. Similarly when the two pairs of gyroscopes reach their diametrically opposite point the linear momentum, delivered when the torques are removed, are again equal and opposite and again cancel out leaving no net momentum outside the system.

Preferably then the apparatus comprises at least first and second gyroscope means such that the linear momentum required by said first gyroscope means in order to precess about an axis remote from its centre is derived from the second gyroscope means precessing in the opposite sense.

Advantageously, the apparatus comprises at least first and second pairs of gyroscope means, the torques required by each gyroscope means being provided by the other of said pair, and each pair providing the linear momentumrequired by the other pair.

Preferably, the path of the gyroscope means is such that the motion of the gyroscope means varies continuously between a substantially entirely precessional motion and a substantially entirely translational motion, thereby providing a smooth propulsion to the system.

A smoother propulsion can also be obtained by providing a plurality of groups of gyroscope means and arranging each group to impart said second movement the vehicle at a different time.

Some embodiments of the present invention utilise a gyroscope means which comprises a wheel which is driven by a central hub. A problem associated with such embodiments is that the degree of propulsion that can be provided by the apparatus is limited by the strength of the materials making up the hub itself.

Preferably therefore, said gyroscope means comprises a substantially annular rim which is driven by a means in contact with that rim.

Furthermore, the rim is preferably rotatably supported at a plurality of points around the rim. This has the further advantage that the level of propulsion that can be provided by the apparatus is increased in accordance with the number of means rotatably supporting the rim.

In a preferred embodiment of the present invention, the gyroscope means comprises two counter-rotating annuli which are retained in a frame means. This has the advantage that the torques exerted by each rim substantially cancel one another and that substantially no net torque is exerted by the frame on the vehicle.

The invention will now be described further, with reference to and as illustrated in FIGS. 10 to 28 of the accompanying drawings in which:

DESCRIPTION OF THE DRAWING FIGURES

Figure 1:
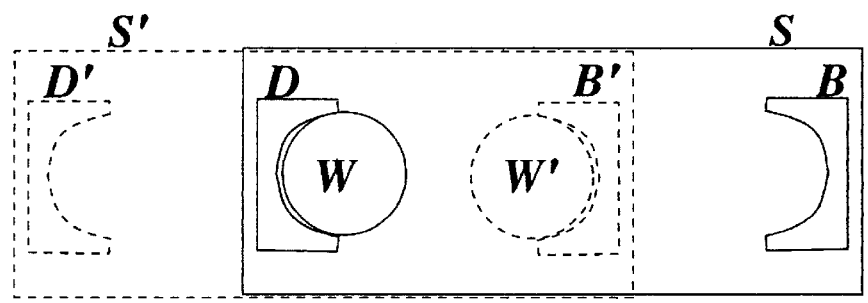
FIG. 1 is an illustration of a first method of moving a vehicle a short distance.
Figure 2:
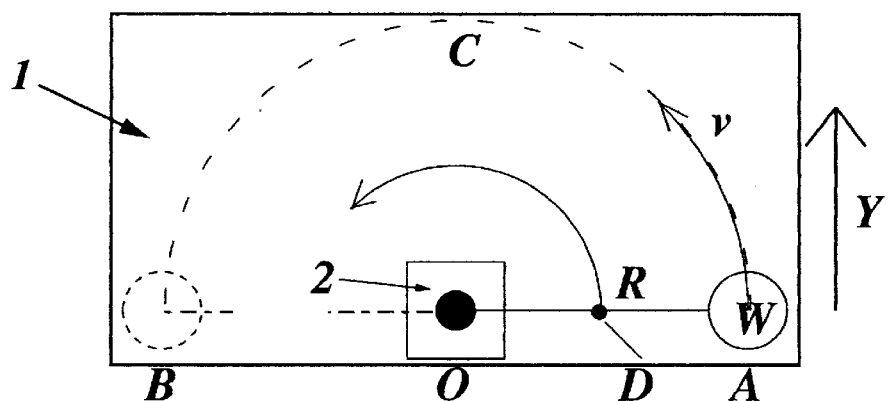
FIG. 2 and 3 are illustrations of a second method of moving of a vehicle a short distance.
Figure 3:
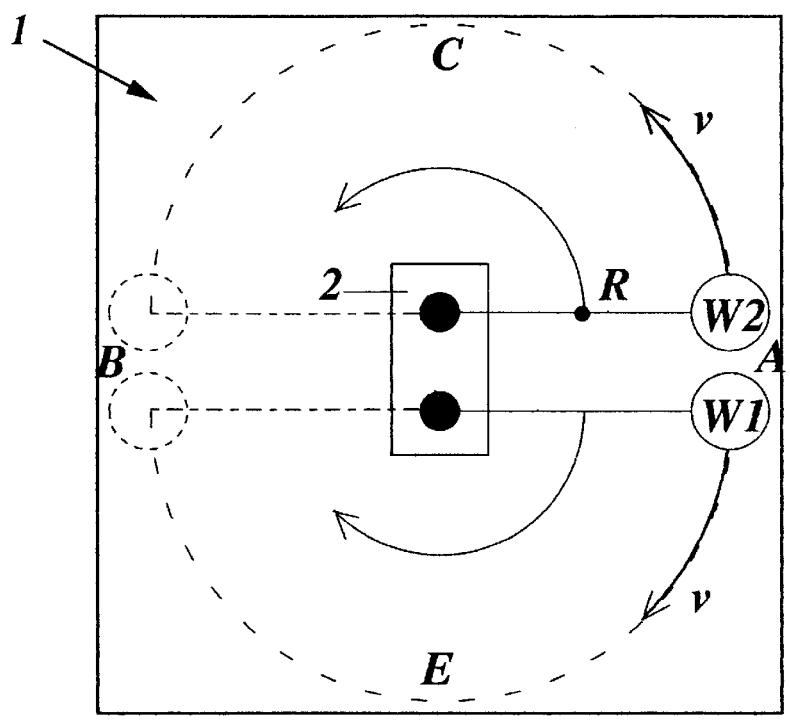
Figure 4:
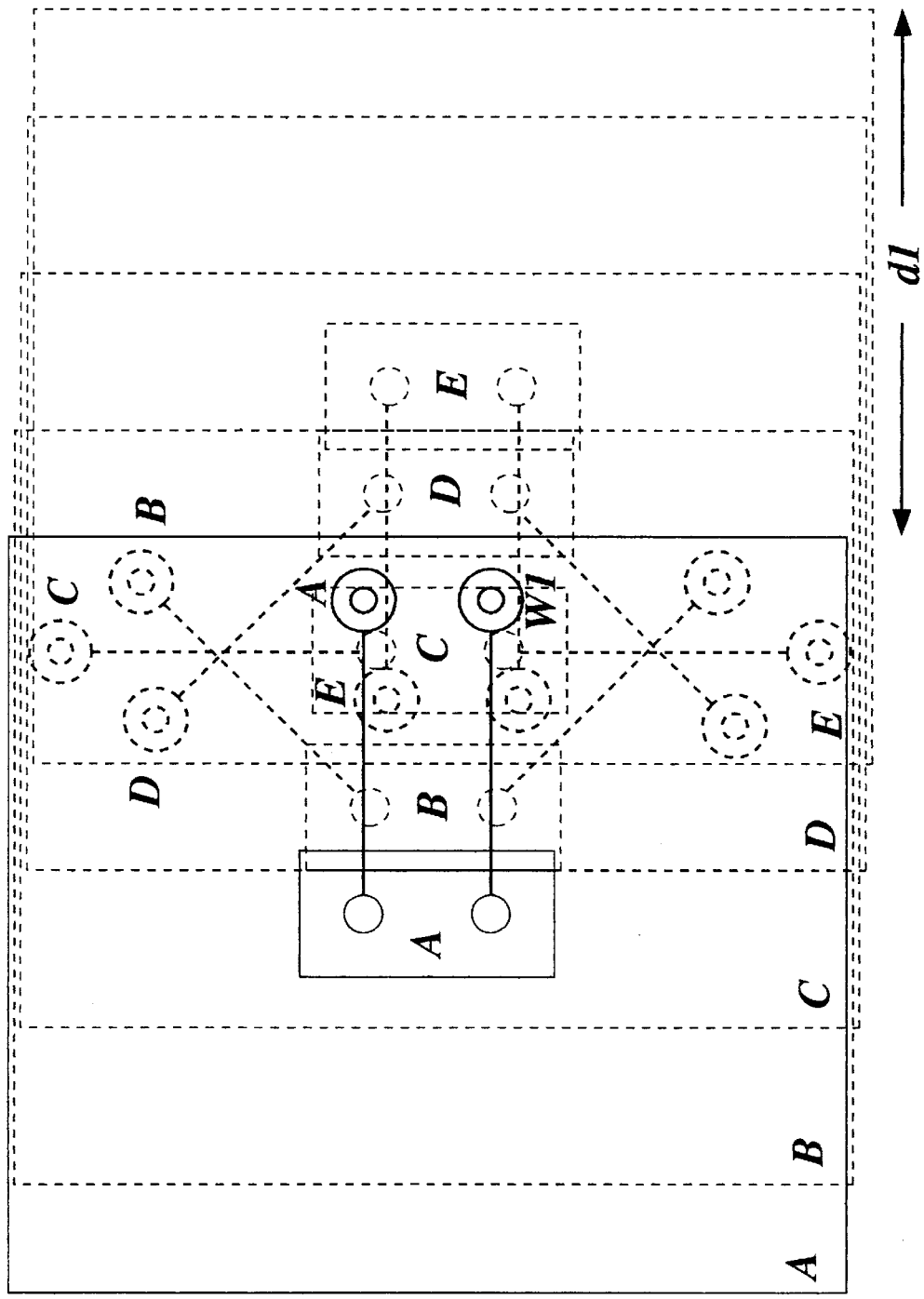
FIG. 4 is an illustration of the motion of the vehicle of FIG. 3 if the masses of W1 and W2 are relatively large in comparison to the mass of the vehicle.
Figure 5:
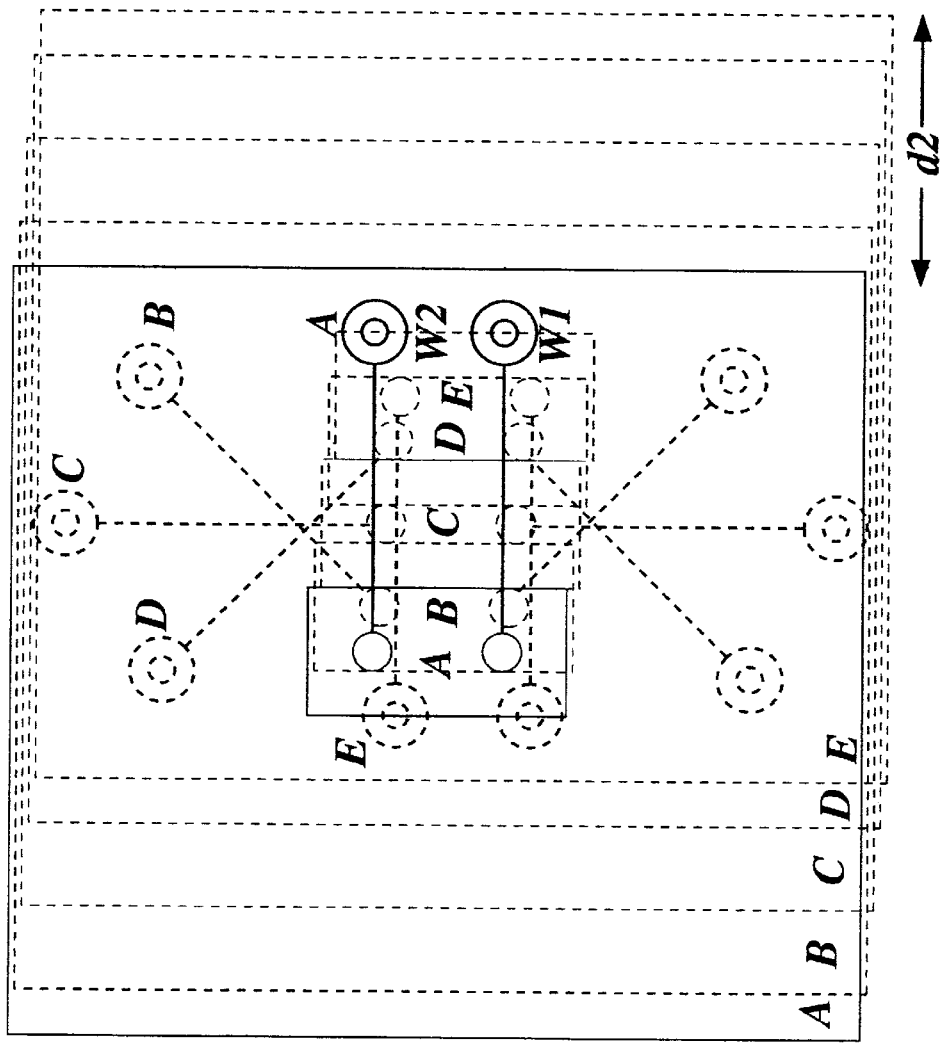
FIG. 5 is an illustration of the motion of the vehicle if the masses of W1, W2 are relatively all in comparison to the mass of the vehicle.
Figure 6:
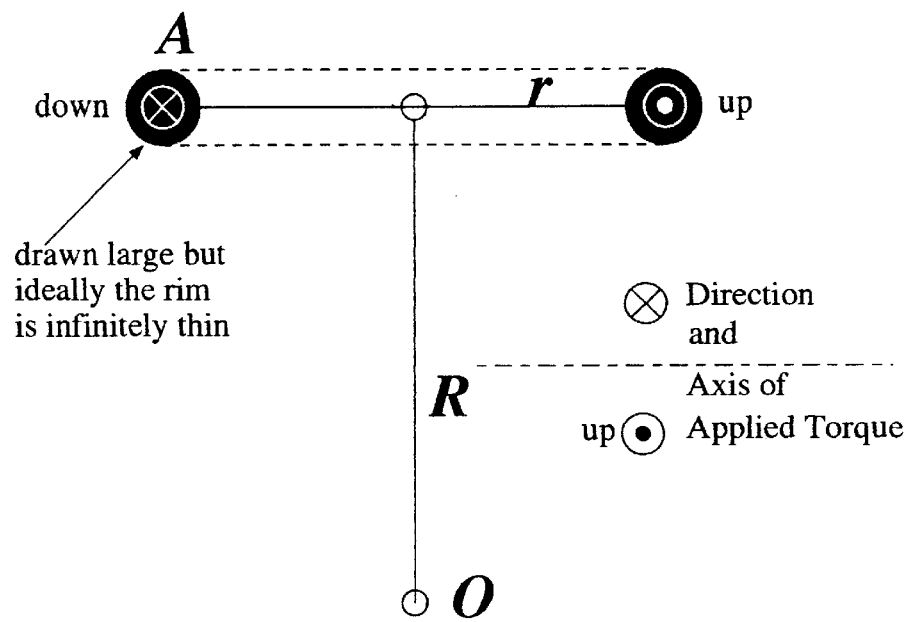
FIG. 6 is a schematic illustration of a gyroscope adapted to precess about an axis remote from the center of the gyroscope.
Figure 7A:
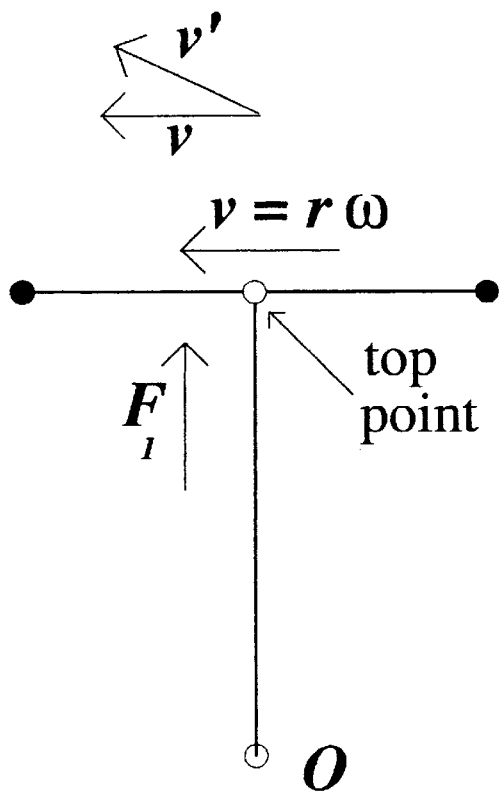
Figure 7B:
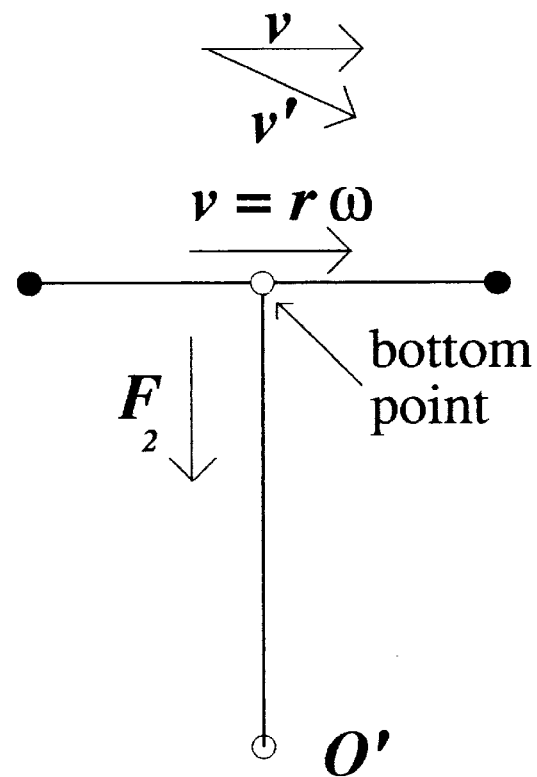

FIGS. 7A and 7B together form a schematic illustration of how a gyroscope can move in a circle as a result of a torque being applied at right angles to the spin axis of the gyroscope, without requiring the application of a centripetal force to the center of the precession.

Figure 8:
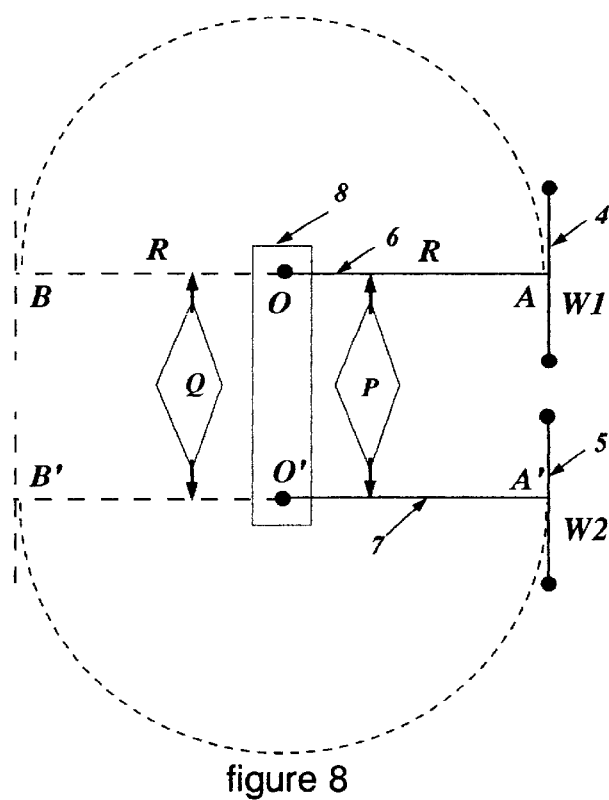

FIG. 8 is a schematic illustration of an apparatus which can be used to demonstrate the principle underlying the present invention.

Figure 9:
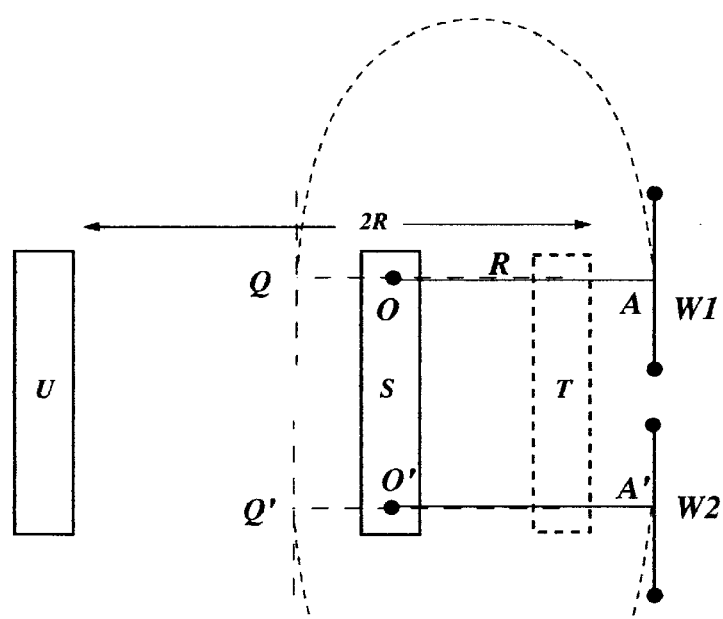

FIG. 9 is a schematic illustration of the motion of the apparatus of FIG. 8 if the wheels employed therein are imperfect.

Figure 10:
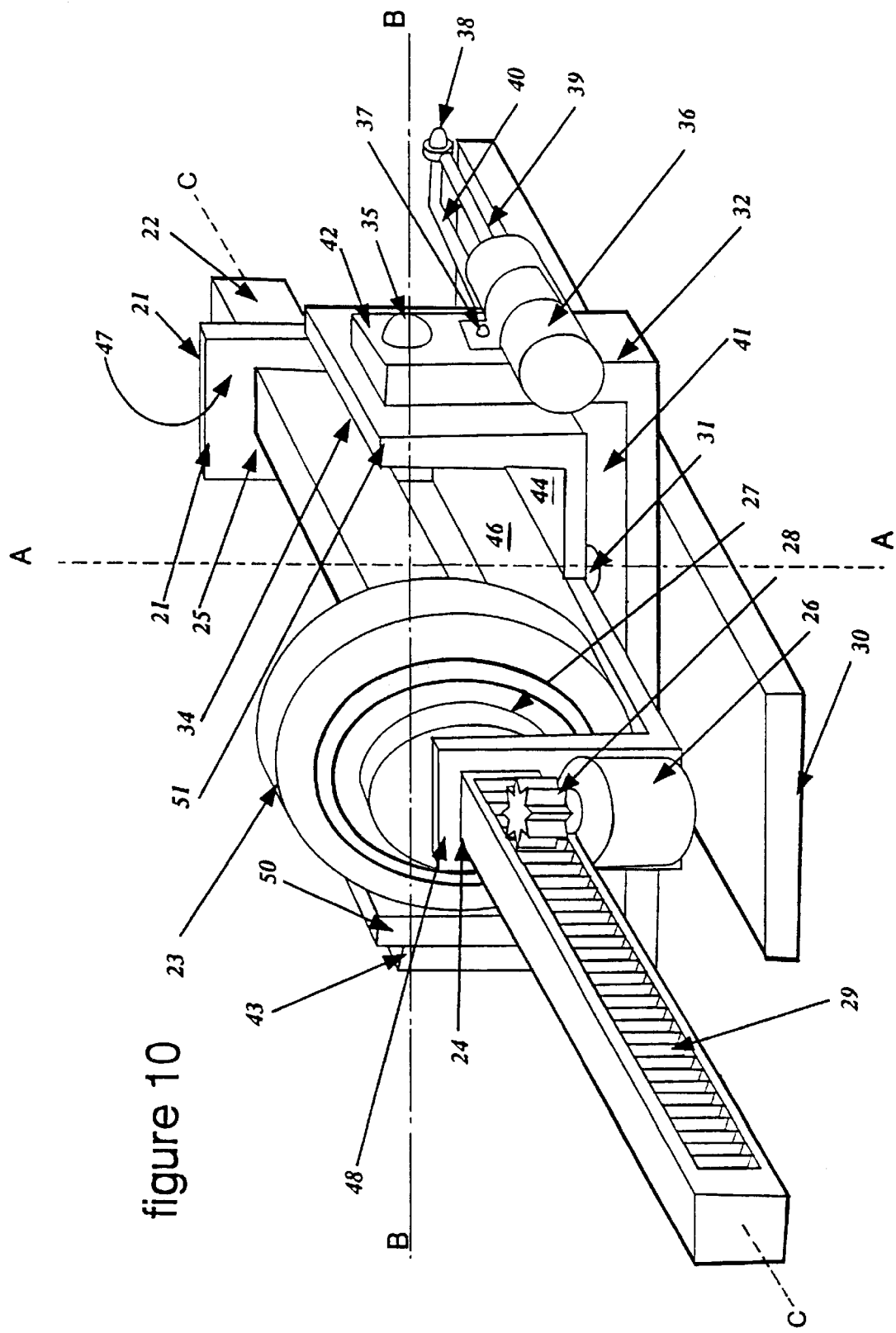

FIG. 10 is a perspective view of one of four identical gyroscopic devices that comprise the first embodiment of the present invention.

Figure 11:
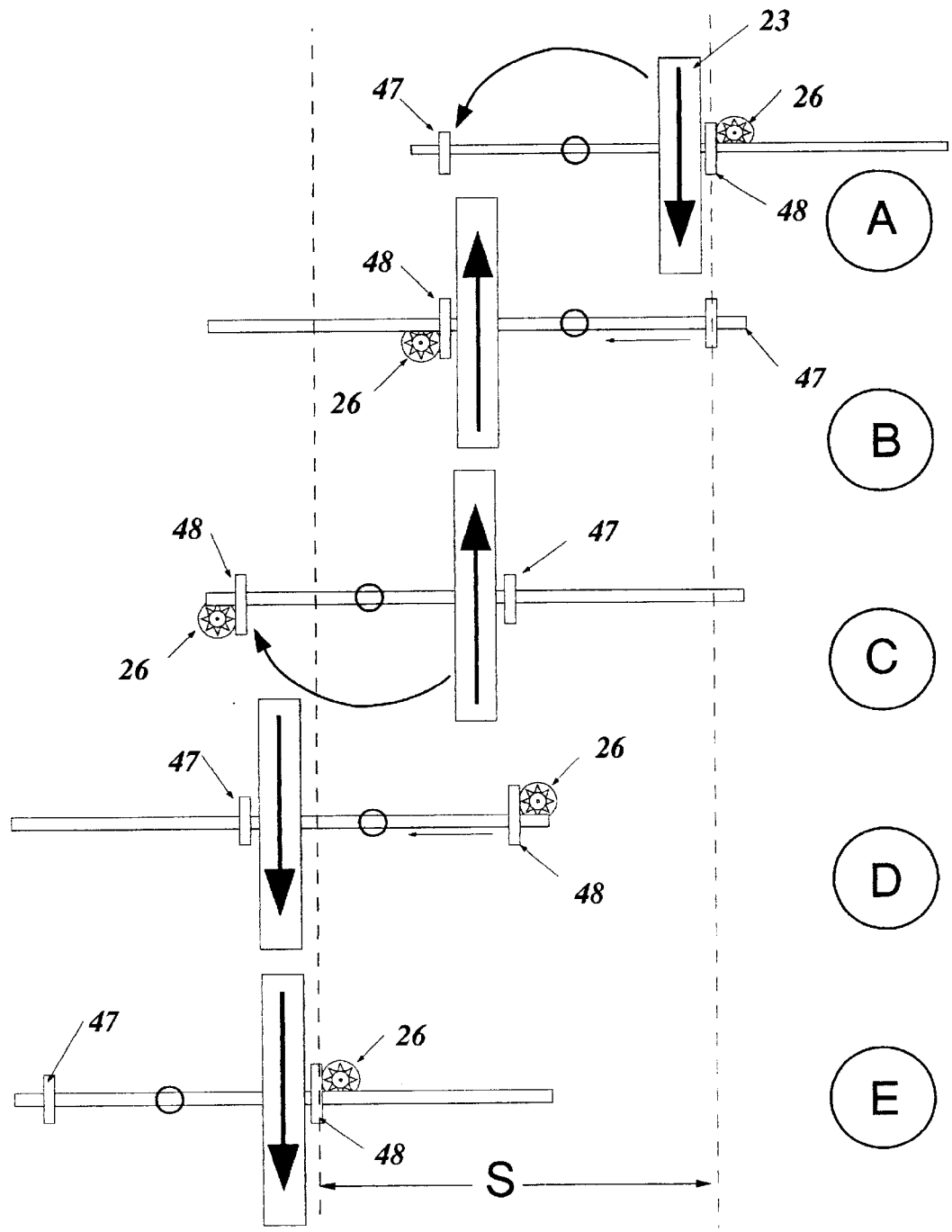

FIG. 11 illustrates the cycle of operations of one of four identical gyroscopic devices that comprise the first embodiment of the present invention.

Figure 12:
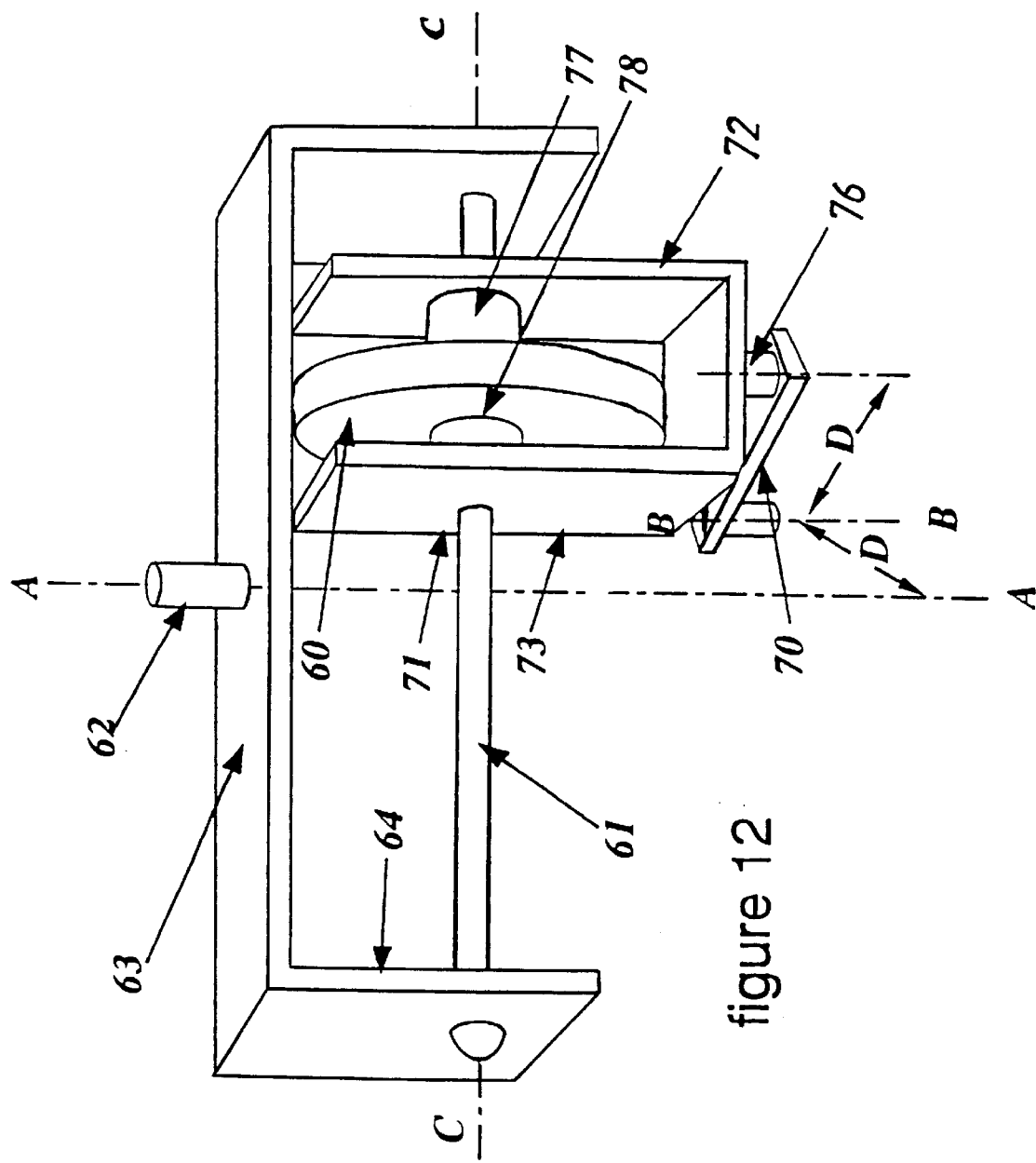

FIG. 12 is a perspective view of a constituent part of a second embodiment of the present invention.

Figure 13:
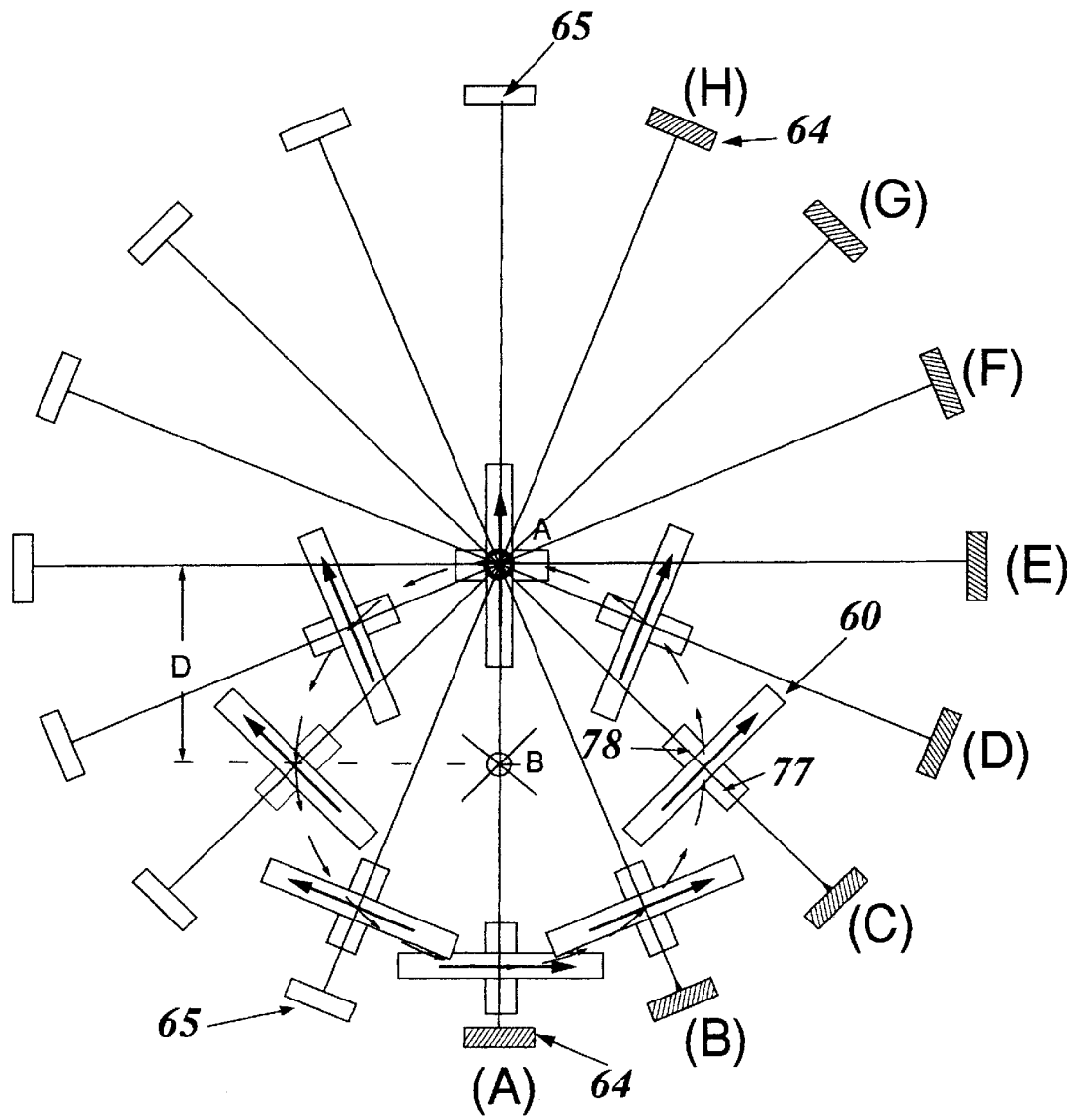

FIG. 13 illustrates the motion of the one of the gyroscopes in the second embodiment of the present invention.

Figure 14:
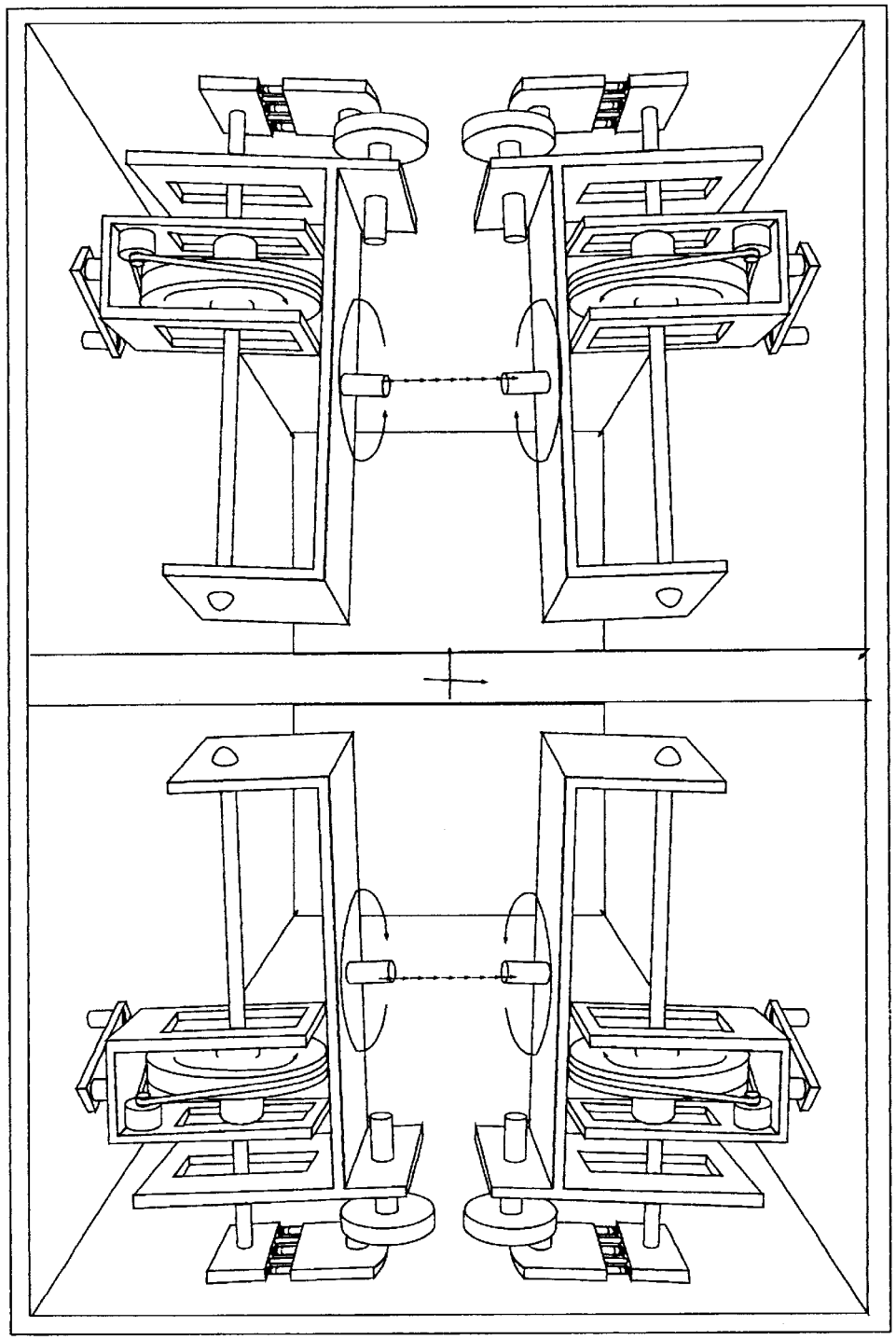

FIG. 14 is a perspective view of four such constituent parts as illustrated in FIG. 12 combined so as to eliminate substantially any net torque on the vehicle being propelled.

Figure 15:
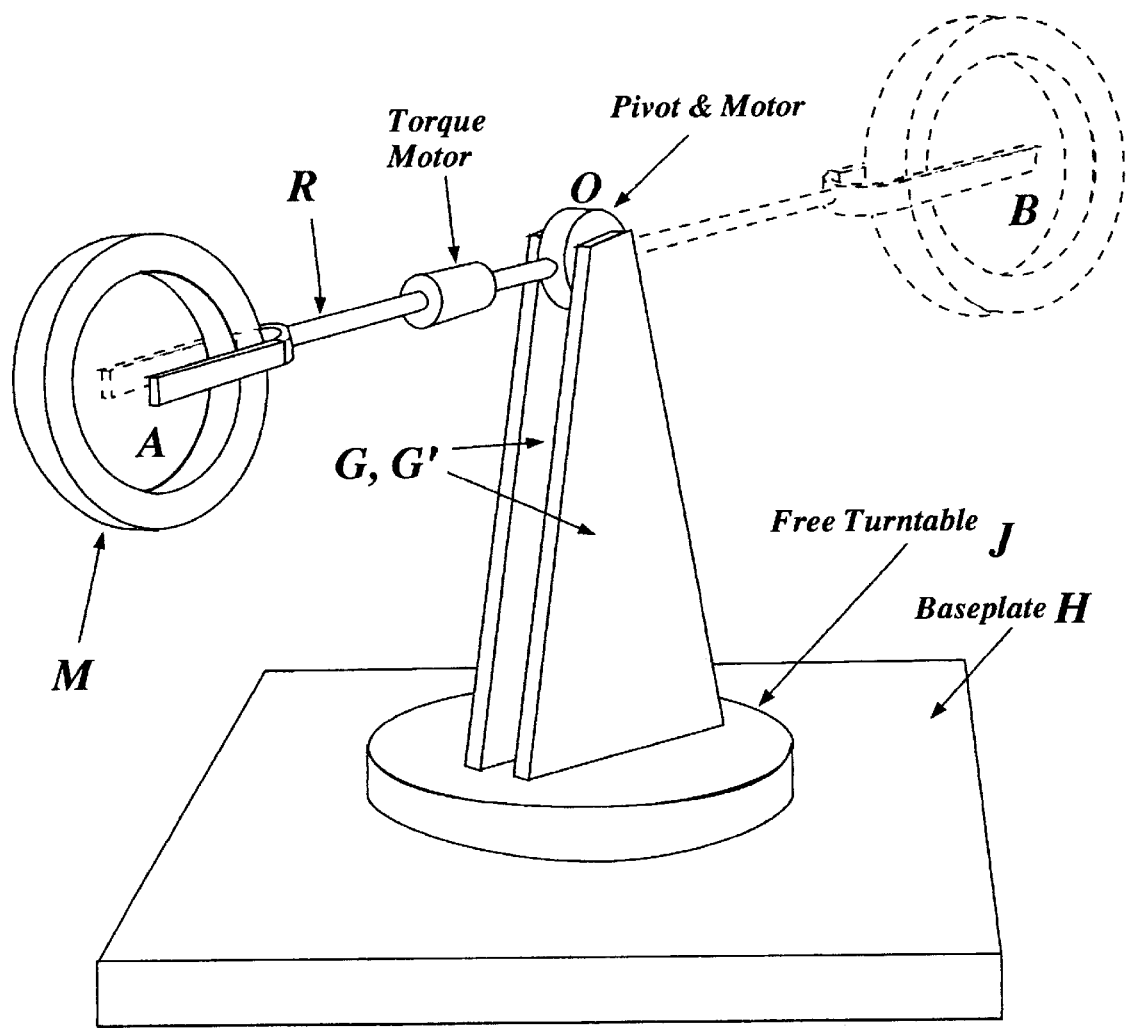

FIG. 15 is a schematic view of an apparatus, the view being used to explain the operation of a third embodiment of the present invention.

Figure 16:
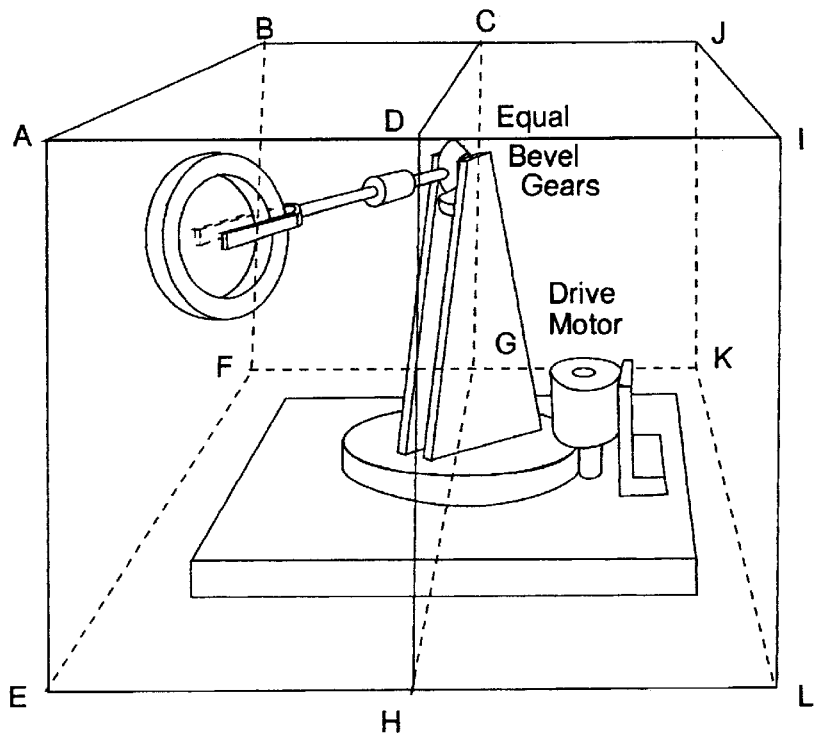

FIG. 16 is a perspective view of a constituent part of a third embodiment of the present invention and illustrates the three dimensional space required for motion of that part.

Figure 17:
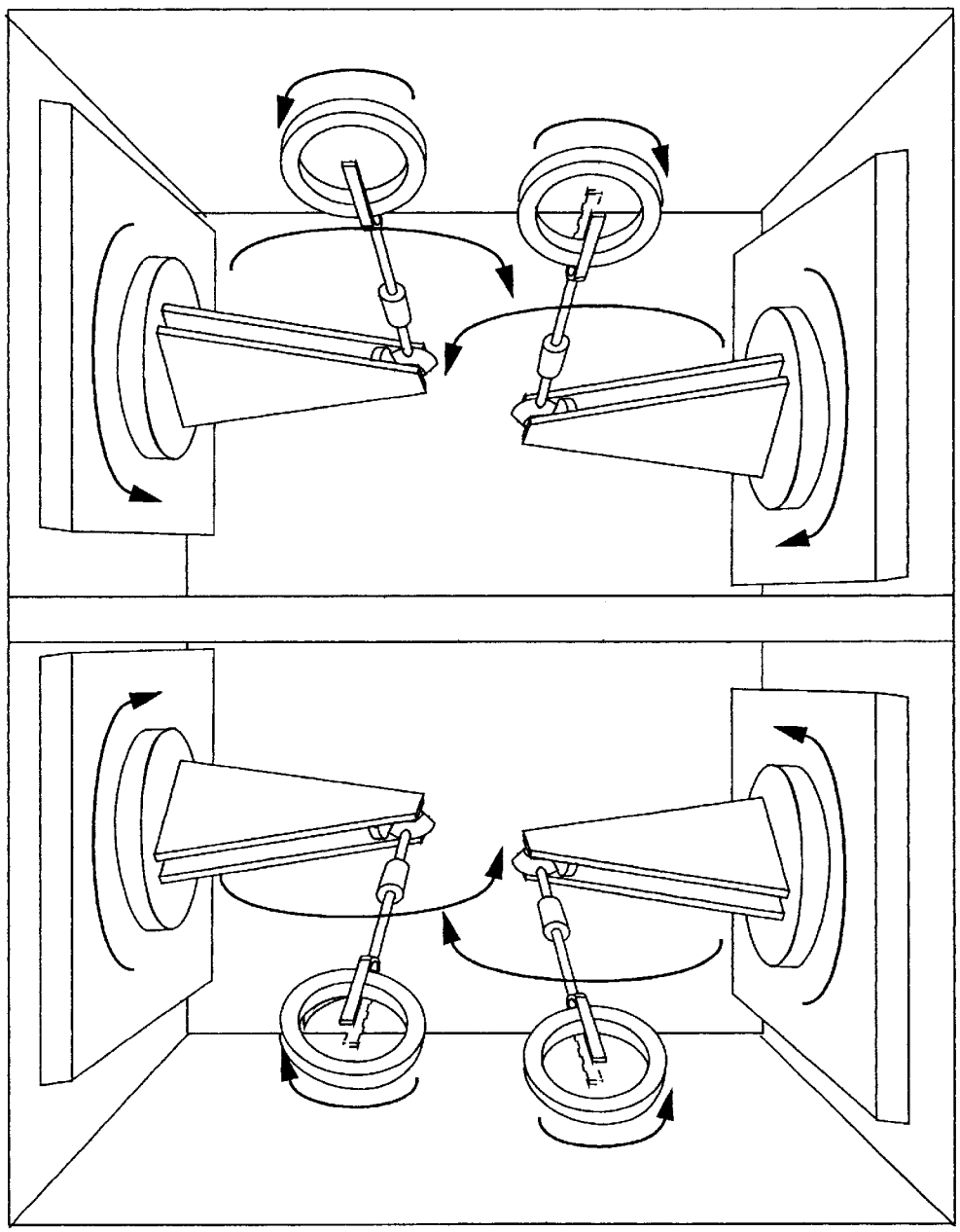

FIG. 17 is a perspective view of four such constituent parts as illustrated in FIG. 15 combined so as to eliminate substantially any net torque on the vehicle being propelled.

Figure 18:
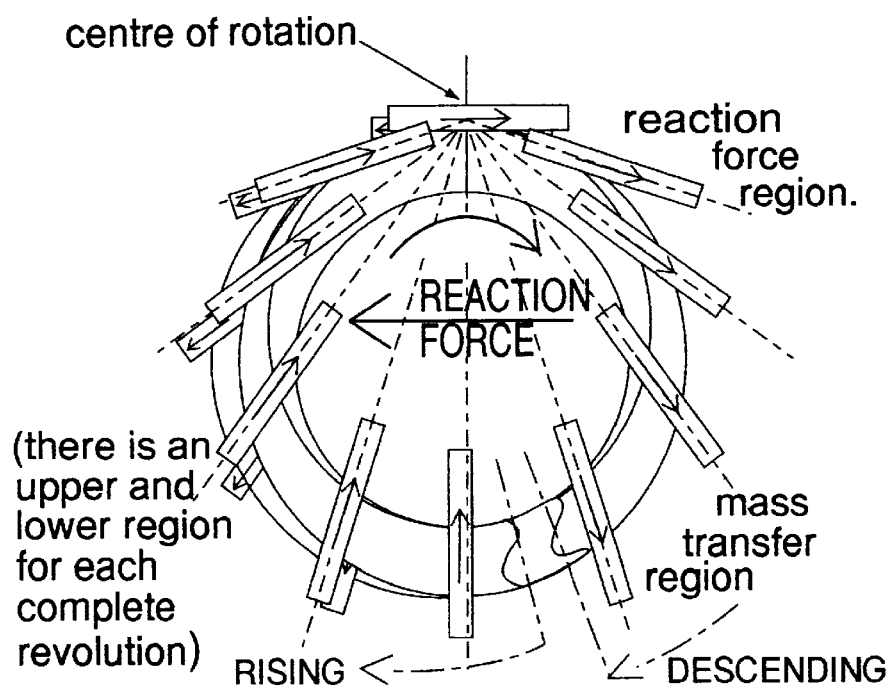
Figure 19:
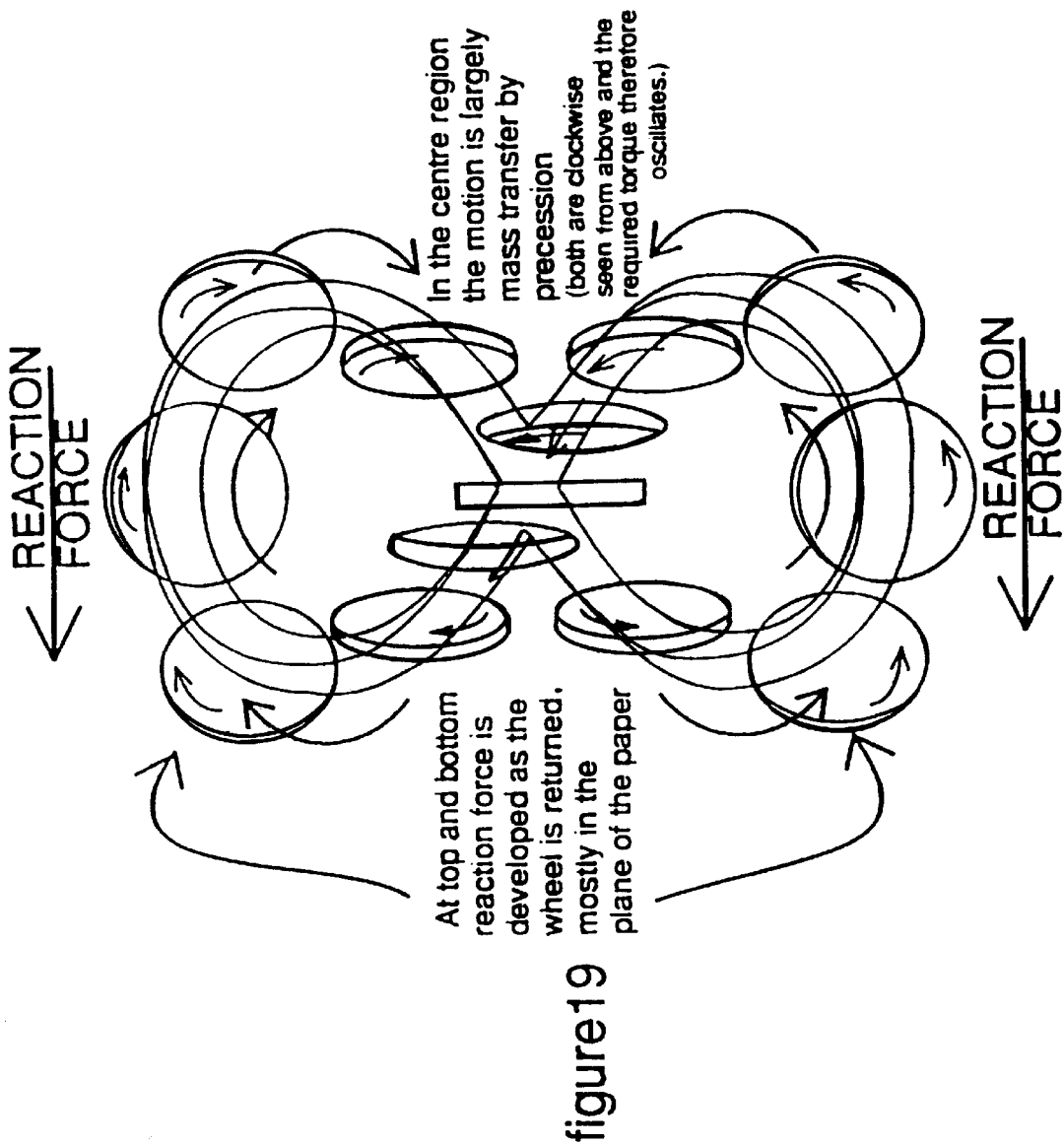
Figure 20:
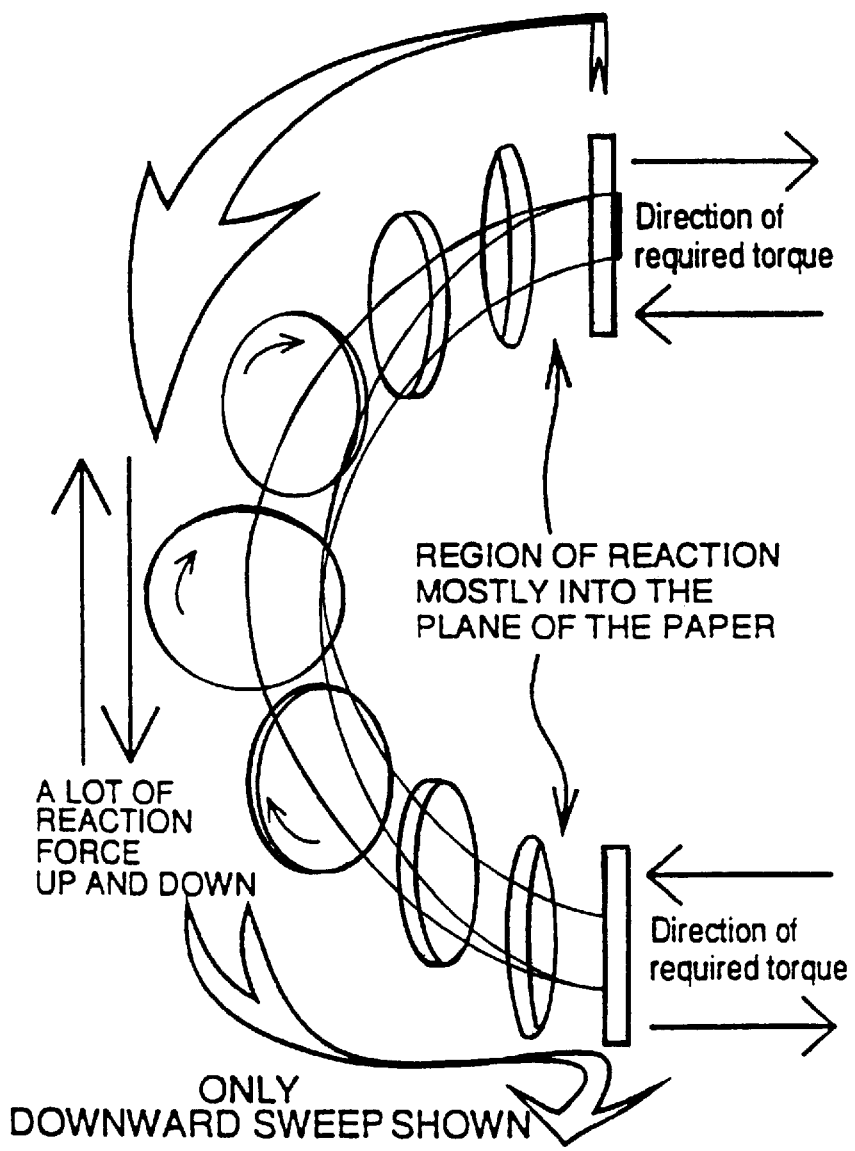

FIGS. 18, 19 & 20 are diagrammatic representations of the forces developed during one cycle by a single gyroscope in the third embodiment of the present invention.

Figure 21B:
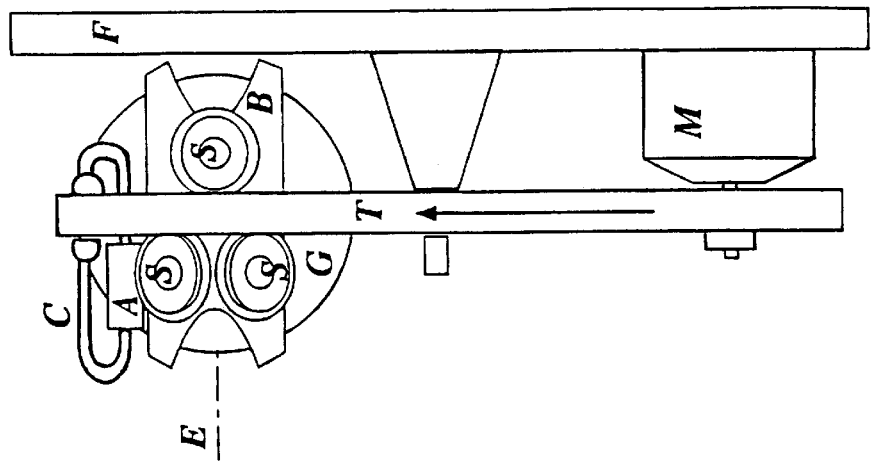
Figure 21A:
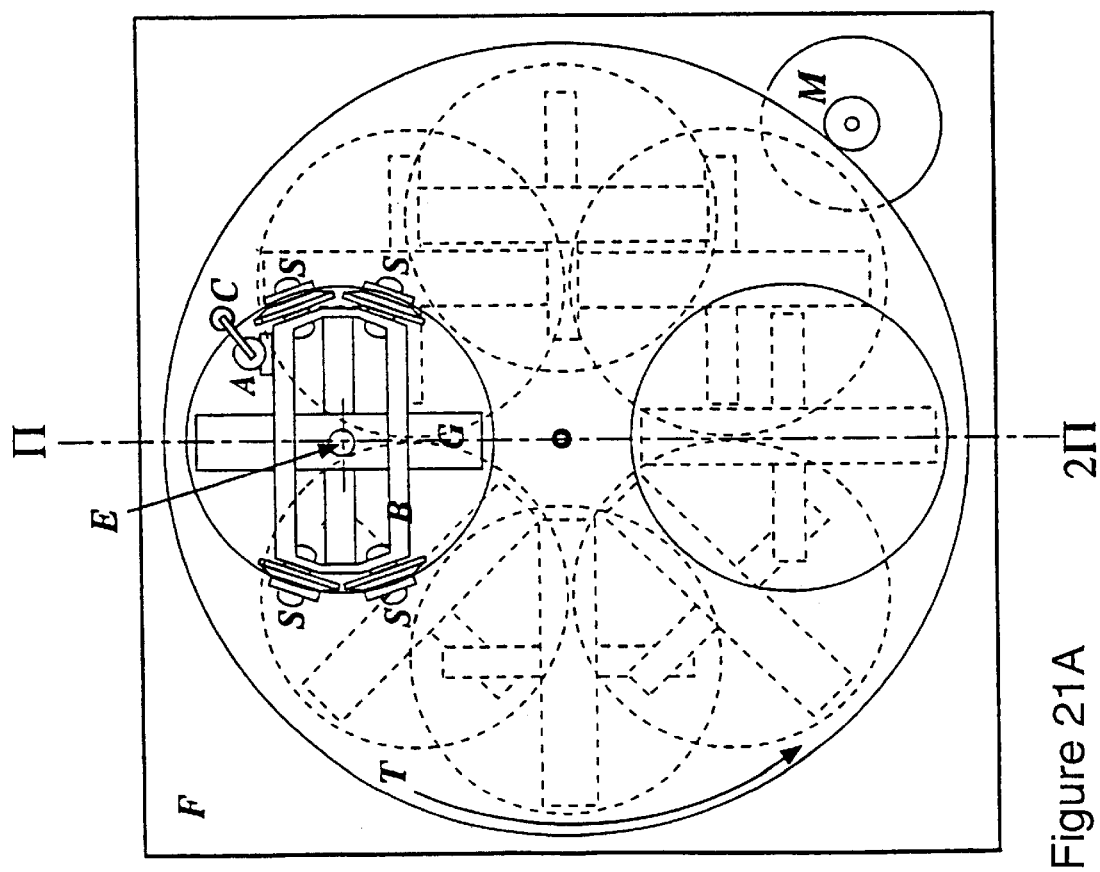

FIG. 21 is a view in plan and elevation of a constituent part of a fourth embodiment of the present invention.

Figure 22:
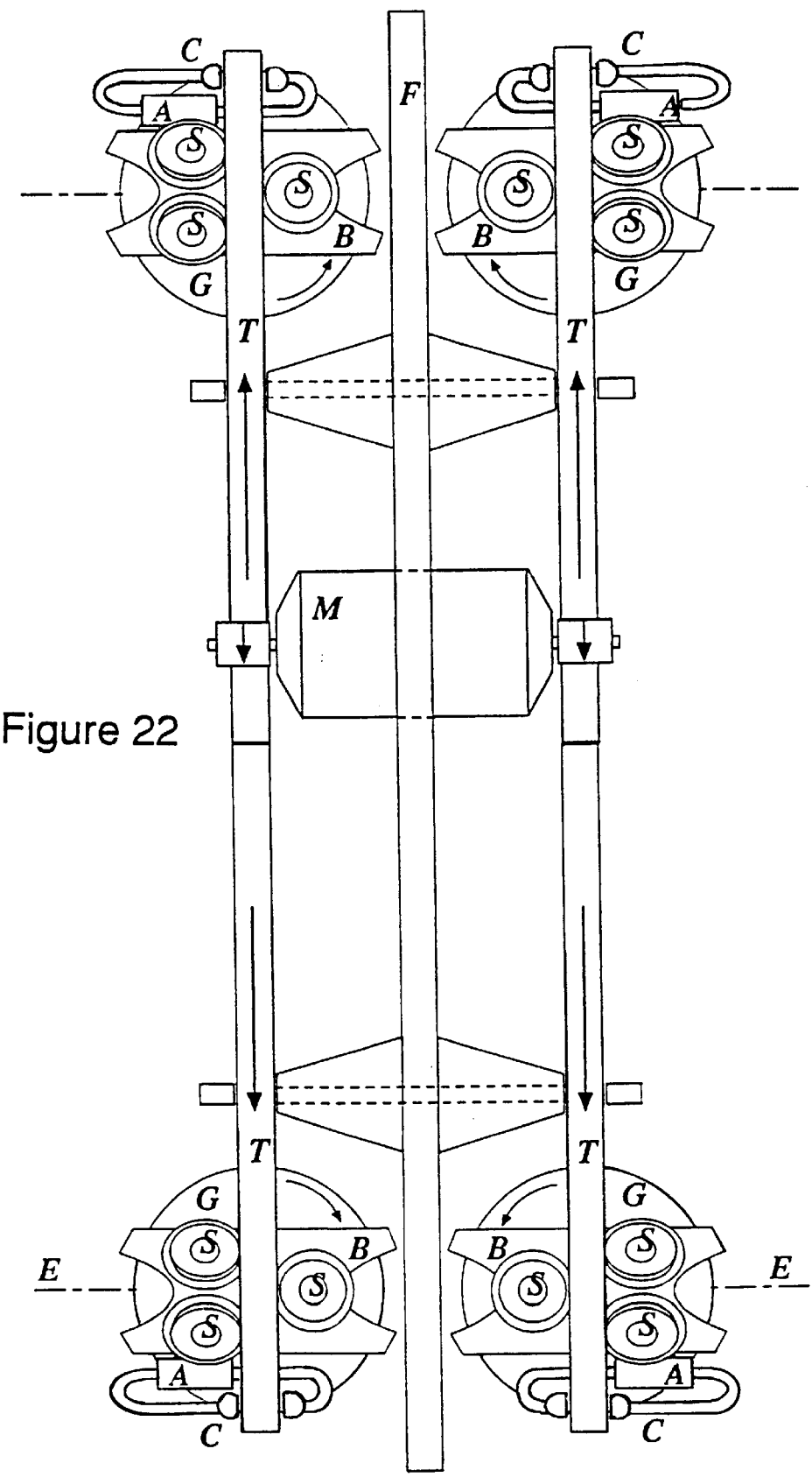

FIG. 22 is a view in elevation of four such constituent parts as depicted in FIG. 21 and arranged to eliminate any net torque on the vehicle.

Figure 23:
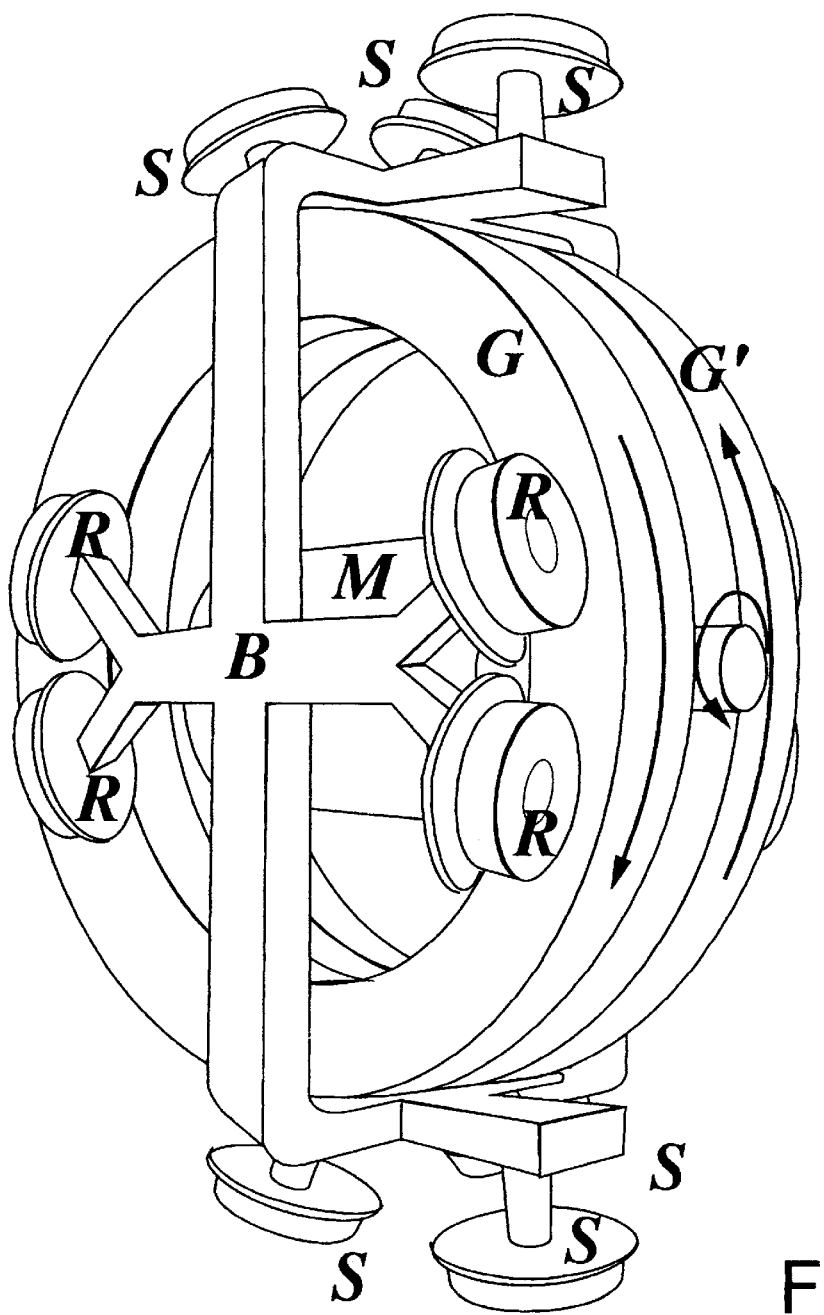

FIG. 23 is a perspective diagram of a fifth embodiment of the present invention so designed to maximise the mass of the gyroscope means both lying in a plane at right angles to the spin axis of the gyroscope means and being located at a predetermined distance from the spin axis and which is capable of being substituted for any two counter rotating single gyroscopic means in any of the preceding four embodiments.

Figure 24:
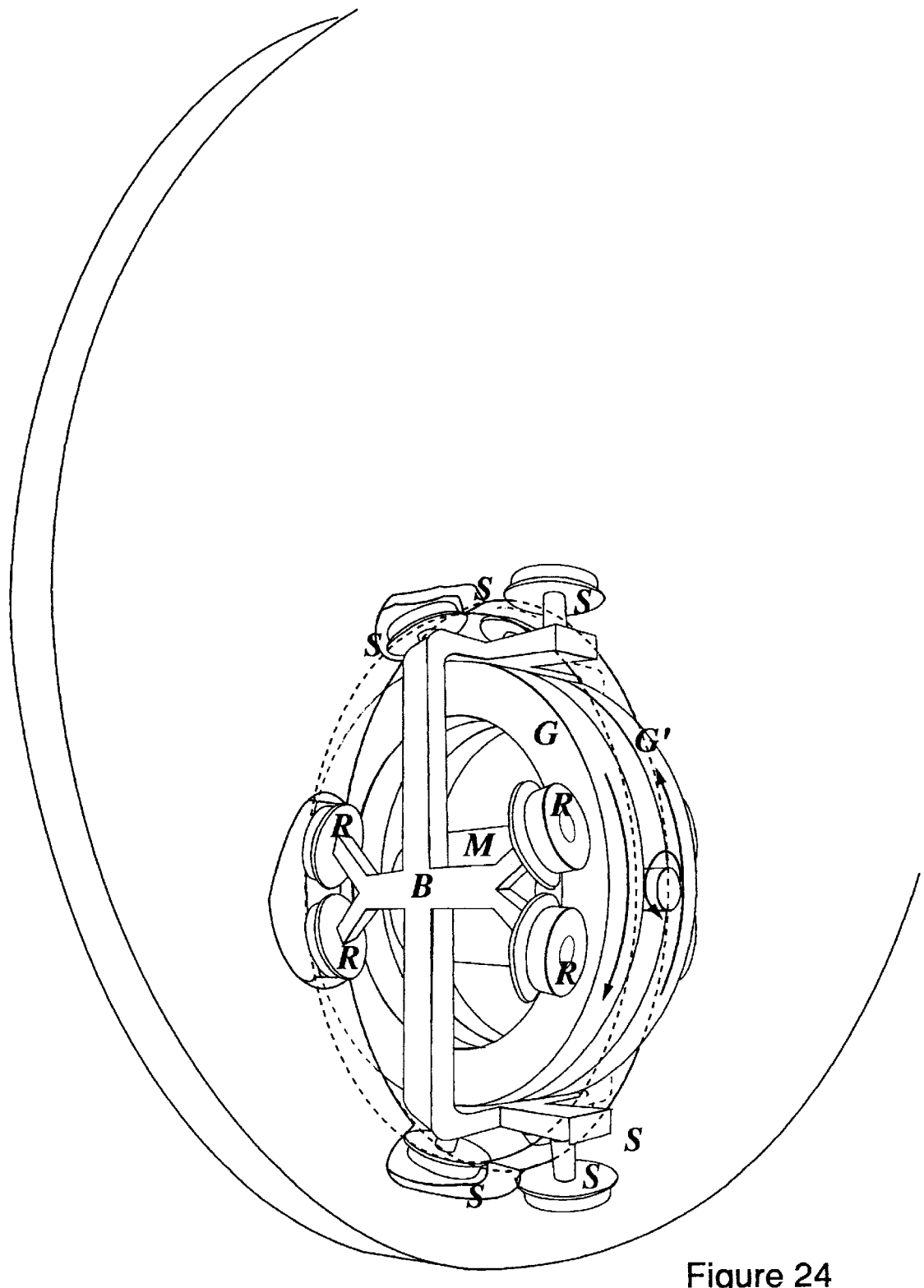

FIG. 24 shows the fifth embodiment incorporated into the fourth embodiment.

Figure 25:
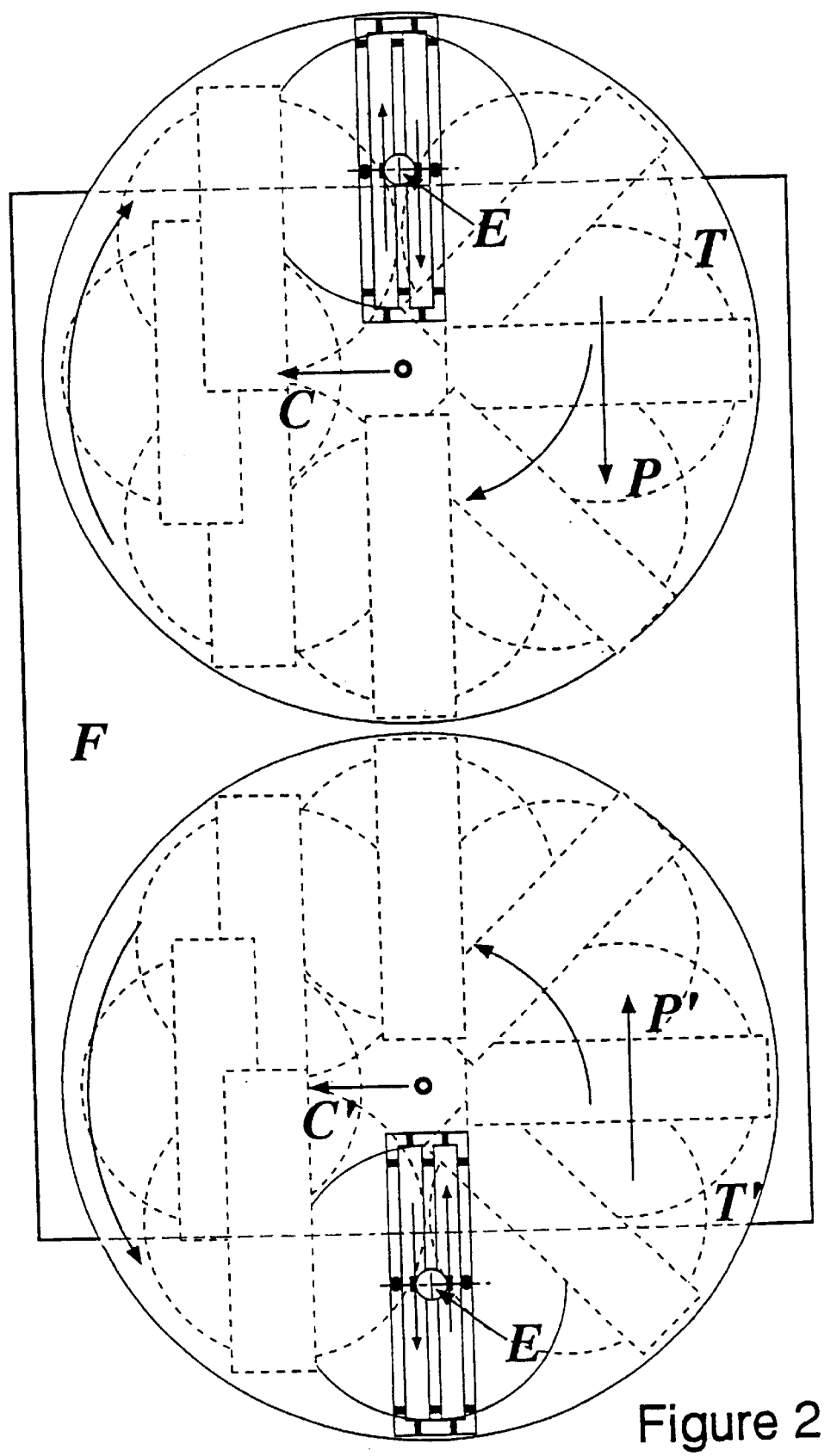
Figure 26:
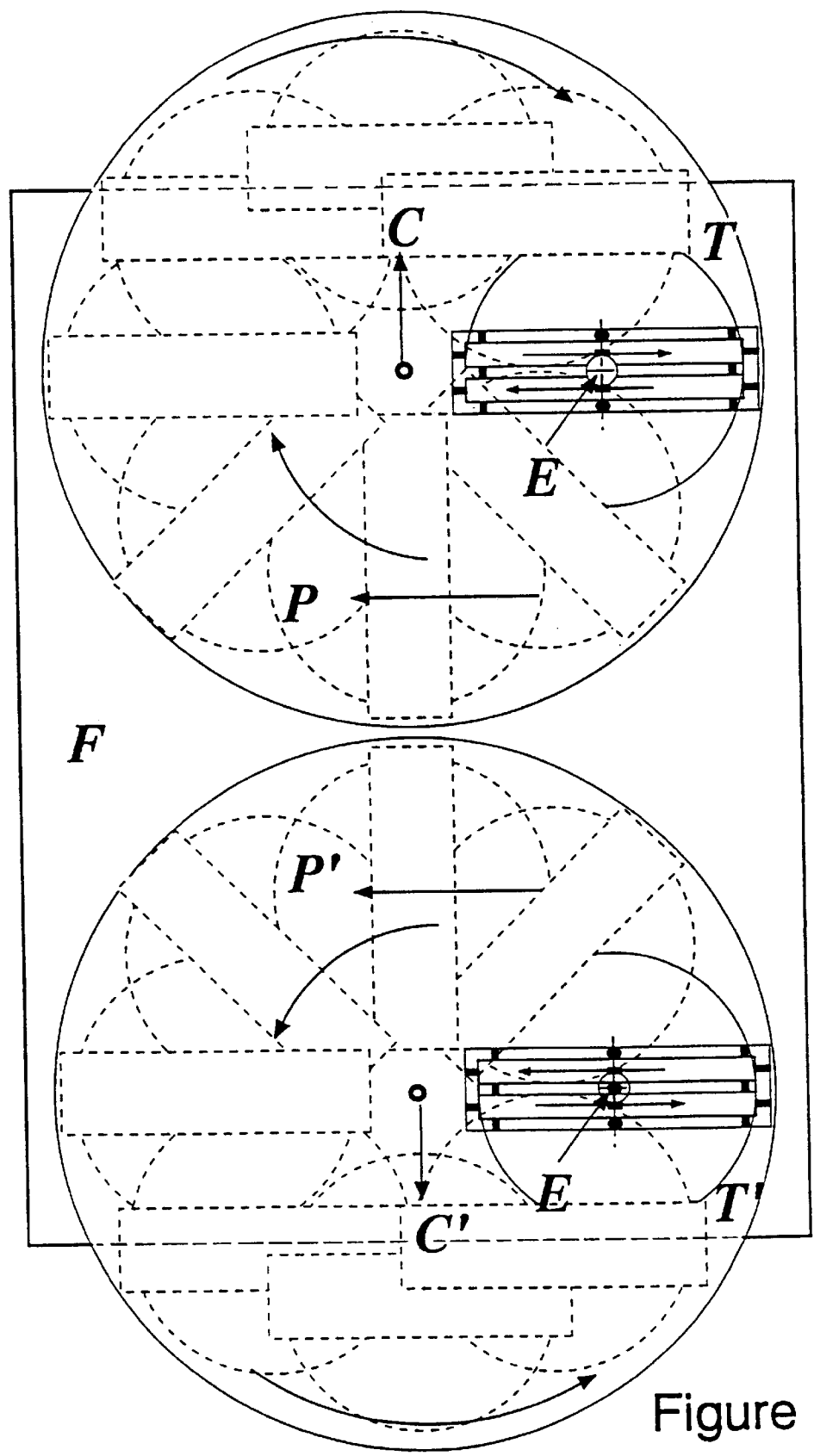

FIGS. 25 and 26 indicate two arrangements of FIG. 24 so as to eliminate net torque on the vehicle.

Figure 27:
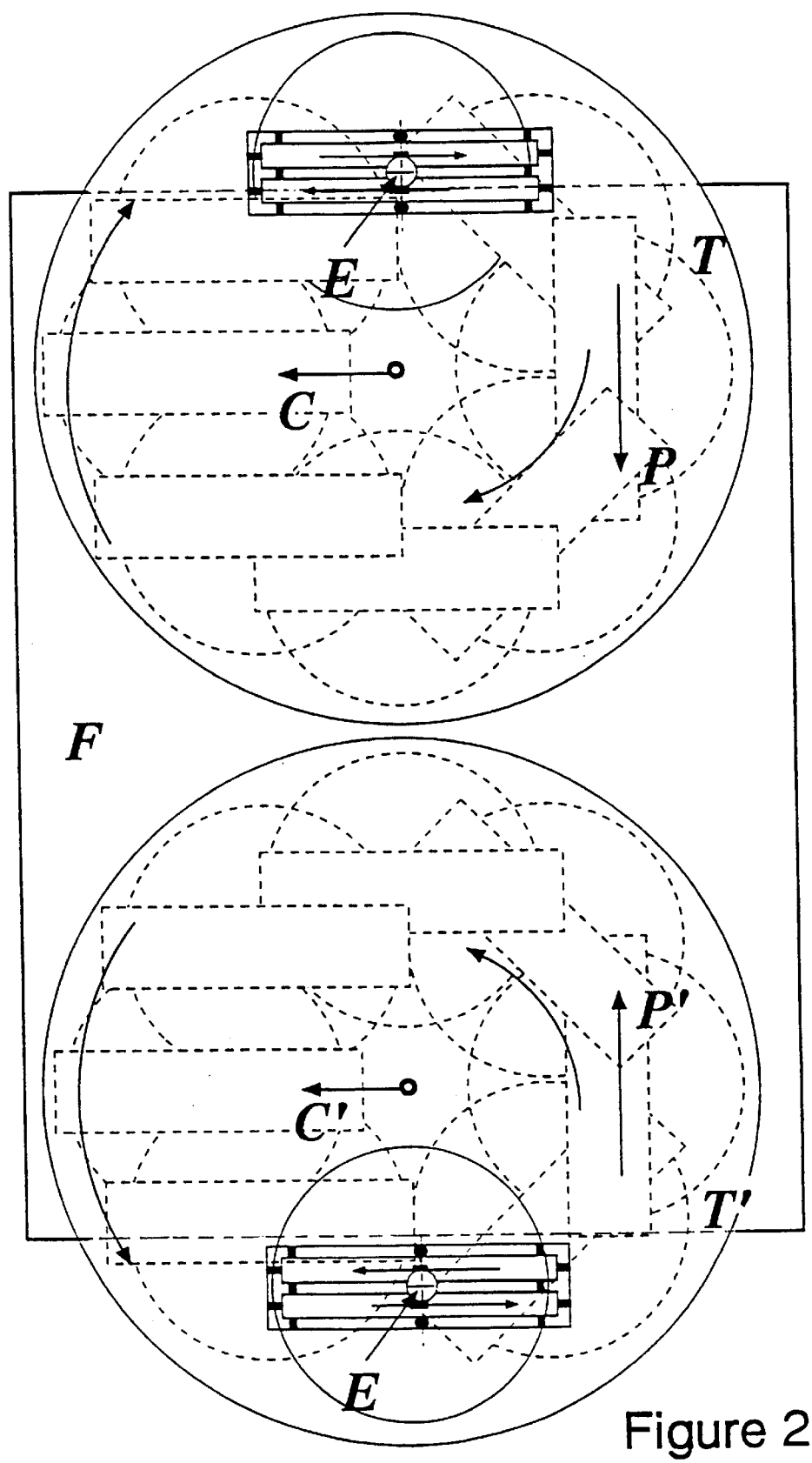
Figure 28:
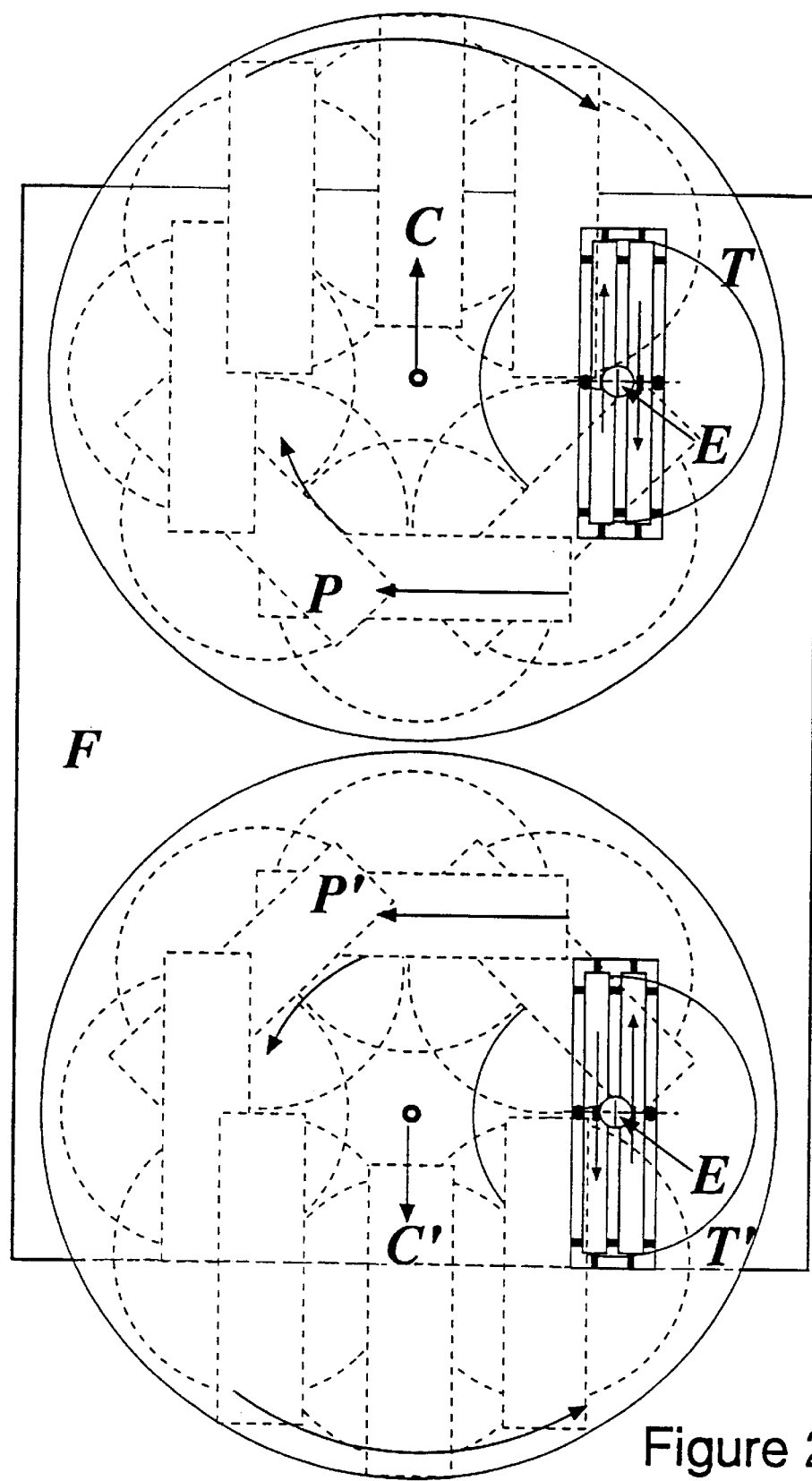

FIGS. 27 and 28 further illustrate the limiting alternative attitude of the fifth embodiment with respect to the fourth embodiment.

DESCRIPTION OF A PREFERRED EMBODIMENT

Referring now to FIG. 10, which shows one of the four gyroscope units of the first embodiment of the present invention, each gyroscope unit comprises a horizontal base plate (30), a cradle means (32,34), which cradle means supports a translatable shaft (22) and enables the rotation of that shaft about a vertical axis AA which passes through the centre of the shaft and a horizontal axis BB which also passes through the centre of the shaft and intersects the axis AA. The shaft (22) in turn carries a gyroscope (23) which is fixed against movement along the shaft but is free to rotate around the shaft.

The base plate 30 is arranged to be secured to the vehicle to be propelled by the system.

In more detail, the cradle (32,34) comprises an outer U-shaped member (32) which is connected to the base plate (30) by a pivot (31) which enables the outer U-shaped member (32) to rotate about the vertical axis AA. The outer member (32) is formed by a substantially horizontal central section (41) which has an arm (42,43) depending vertically from each of its ends. Each of these arms (42,43) carries a pivot (35) which is disposed on the axis BB.

The inner member (34) of the cradle is formed from a relatively long U shaped member (21) and a pair of side arms which extend perpendicularly outwardly from the long member at a position half way along its length. The long member consists of a substantially horizontal section (46)

from either end of which an arm (47,48) extends vertically upwardly. Likewise each of the side arms (44) has a part extending vertically upwardly (50,51) from its end. Each of the arms (47,48) extending vertically upwardly from the ends of the long member (21) carries a rectangularly shaped bearing (24,25) towards its upper end. Each of the vertically depending arms (50,51) on the side arms defines a recess which is engaged by the respective pivot (35) on the outer cradle member (32). When each of the horizontal sections (41,46) of the inner and outer cradle members (32,34) are in a horizontal position then the centre of the bearings (24,25) which define the axis 'CC' are positioned to be at the same height as the pivots (35) so that the axis 'CC' intersects the axes 'AA' and 'AB'.

A shaft (22) of substantially regular rectangular cross-section and of a length slightly greater than twice the distance between the bearings (24,25) is held by the two bearings (24,25). Each of these bearings is configured so as to prevent rotation of the shaft relative to the inner member (34) but to allow it to be linearly translated through the bearings. A rack (29) is cut into one side of the shaft and extends along the shaft by a distance substantially equal to the distance between the two bearings (24,25). A motorised bearing (27) is fixedly attached to the shaft (22) at its mid point which lies between the two bearings (24,25). A gyroscope (23) is in turn carried by this motorised bearing.

Finally, the means for translating the shaft is provided by a motor (26) which is supported by the inner cradle member (34). The motor (26) drives a spur gear (28) which engages with the rack (29) on one side of the shaft (22).

To enable the gyroscope unit to be operated outside a gravitational field a means is provided for exerting a torque about the pivot (35). This torque providing means consists of a solenoid actuator (36) which is attached to the upright arm (42) by a pivoted clamp (37). The solenoid (36) actuates a rod (39) which in turn acts on a connector (40) which in turn engages the upright member (51) of the inner part of the cradle (34).

It will be appreciated by those skilled in the art that power must be supplied to the torque providing means (36), the actuating motor (26) and the motorized bearing (27). A person skilled in the art will be able to envisage a number of ways of supplying this power to the apparatus.

In order for the means (36) to exert a torque on the gyroscope (23) it will be necessary to supply a torque which prevents the vehicle (with the base plate (30) and outer cradle member (32)) rotating around the pivot (35). This may be achieved by securing an identical gyroscope unit to the vehicle and it to precess about the axis AA in the same direction as the above described first gyroscope unit but with the gyroscope in the second unit spinning in the opposite direction to the gyroscope in the first unit. For example, the inner cradle of the second unit may also be fixedly attached to the base plate (30) whereby the torques on that base plate owing to the precession of the two gyroscopes cancel.

Alternatively, in a terrestrial application of the first embodiment, the required torque may be provided by the weight of the gyroscope, in combination with an equal and opposite reaction provided through the vehicle to the base plate (30).

It will further be appreciated that it will not be possible to supply each of the gyroscopes of the first and second gyroscope units with the requisite momentum along their precessional path without imparting an equal and opposite momentum to the vehicle. The requisite momentum for the precession of the first gyroscope unit may be obtained from a third gyroscope unit identical to the first unit and in which the pivots (35) of that unit also lie along the axis BB. The gyroscope of that third unit may be set spinning in the same direction as the gyroscope (23) of the first unit and caused to precess in the opposite direction to the gyroscope of the first unit, whereby the net linear momentum required to launch the first and third gyroscopes would be zero. In order to provide the torque required for the precession of the third gyroscope unit a fourth gyroscope unit may be provided which precesses about the same axis as the third gyroscope unit and in the same direction as the third gyroscope unit but with the gyroscope of the fourth unit spinning in the opposite direction to the gyroscope of the third unit. Furthermore, the fourth unit supplies the requisite launch momentum for the second gyroscope.

Since the gyroscopes of the first and third gyroscope units are spinning in the opposite direction to the gyroscopes of the second and fourth gyroscope units then it will be seen that the torques required to start the gyroscopes spinning are also cancelled in the above arrangement. Hence, no net torque is exerted on the vehicle.

It is to be appreciated that in terrestrial applications, some or all of the required torque and linear momentum may be provided by the medium through which the vehicle is travelling, or the surface over which the vehicle is travelling. For example, the torque may be provided by reaction against rails along which the vehicle is travelling, or, in the case of a boat, by reaction between the keel and the water.

Preferably, however, the torques and linear momenta will also be balanced in a propulsion apparatus for terrestrial use. For example, in the case of a propulsion system for a boat this has the further advantage that the water is less disturbed and quieter propulsion results.

The cycle of operations of the first embodiment of this invention is shown in FIG. 11. For simplicity only the ends (47,48) of the inner cradle (34), the gyroscope (23), with the direction of spin of gyroscope (23) indicated by the arrow, and the motor (26) of the first gyroscope unit are drawn. At 'A' a torque is applied to gyroscope (23) and the system is allowed to precess to 'B' where the torque is removed. The motor (26) now operates and attempts to return the assembly to its previous position in space but because the gyroscope (23) is massive with respect to the remainder of the system the supports move rather than the gyroscope (23) as shown at 'C'. The gyroscope (23) is again caused to precess to 'D' as previously, the torque once more removed and the motor reversed. The supports again move further than the gyroscope (23) as shown at 'E' and the whole system has been caused to translate a distance 'S'. The system will be seen to be in the same position as at 'A' and the whole cycle may be repeated.

It will be realised that the operations of the other three gyroscope units may be carried out in synchronism with the operation of the first gyroscope unit such that each of the gyroscopes will be translated in the same direction at the same time.

In order to reduce the step like nature of the movement of the vehicle being propelled a number of other groups of four gyroscopes may be provided. It will be understood that each of these may be operated serially so as to provide a steady succession of movement to the vehicle and thereby smooth the propulsion of the vehicle.

Another method of smoothing the propulsion of the vehicle is to combine the translational and precessional part of the gyroscope cycle into a single compound motion so as to allow the proportion of translational and precessional motion to vary smoothly throughout that cycle. The second embodiment of this invention is an example of an apparatus which achieves this.

Referring now to FIG. 12, the apparatus of the second embodiment consists of three principal parts. The first of these is a means for rotating the direction of the spin axis CC of a gyroscope (60) about a perpendicular axis AA which intersects the axis CC, the second of which is a means for causing the centre of the gyroscope to follow a circular path about an axis BB which is parallel to the axis AA and displaced therefrom by distance D, and the third of which is a means (80,81) for rotating the gyroscope (60) about its own spin axis CC.

The means for rotating the direction of the spin axis of the gyroscope about the first axis AA comprises a horizontal bar (63) rotatably driven about the axis AA by a shaft (62) which is in turn connected to a motor ( not shown). The bar (63) has two arms (64,65) which depend vertically downwardly from each end of the bar (63). A horizontal shaft (61) is carried between the arms (64,65). The gyroscope (60) is rotatably and slidably supported on the shaft (61) at a point intermediate the two downwardly depending arms (64,65). In this way the direction of the spin axis CC of the gyroscope is constrained without dictating the position of the gyroscope along the shaft (61).

The means for causing the centre of the gyroscope to follow a circular path about the parallel axis BB comprises a lower shaft (75) which pivotally supports a substantially horizontal second bar (70) which is thereby rotated about the axis BB, (which axis passes through a first end of the bar (70)), by a motor (not shown) at an angular velocity which is twice that of the angular velocity of the rotation of the upper bar (63). A vertical shaft (76) is pivotably supported at the opposite end of the bar (70) at a distance D from its first end and is fixedly attached to the base of a substantially U-shaped member shown generally at 71. The U-shaped member (71) comprises a horizontal base part which has two upwardly extending arms (72,73) at its ends, each of these arms having a bearing through which the shaft (61) passes. These bearings support the shaft (61) on either side of the gyroscope (60), sleeves (77,78) being provided around the shaft (61) to maintain the position of the gyroscope between the two upwardly extending arms (72,73). Each of these sleeves is preferably of an equal length, thereby positioning the centre of the gyroscope (60) directly above the axis of that shaft (76). In this way the centre of the gyroscope (60) is constrained to follow a circle centred on the vertical axis BB and of radius D, where the distance D is smaller than one quarter of the distance between the downwardly depending arms (64,65) less one half the external distance between the upwardly extending arms (72,73).

The means for rotating the gyroscope about its own spin axis comprises a motorized bearing (not shown) similar to that described in relation to the first embodiment. Those skilled in the art will be able to envisage a number of ways in which the required power can be supplied to the motor.

Each of the shaft (62) and the lower shaft (75) is arranged to be attached to the vehicle to be propelled.

As with the first embodiment of the present invention, the torque developed or required in the precession of the gyroscopes may be obtained from another "mirror image" system so that the two torques cancel leaving no net torque on vehicle. Also, again as with the first embodiment of this invention, any resulting uncancelled forces may be provided by another gyroscope unit. In practice therefore several gyroscope units may be employed together as shown in FIG. 14.

The operation of the unit of the second embodiment of the invention will now be described with reference to FIG. 13. The rotation of bar (63) about axis 'AA' is at half the rate of rotation of the arm (70). When these two motions are combined the motion of the gyroscope is substantially that depicted in FIG. 13, which shows the sequential positions of the gyroscope for one half turn of the bar (63). It will be seen that the gyroscope moves from one end of the shaft (61) to the opposite end of the shaft (61) in the same period as the shaft is rotated by 180°. The way the gyroscope is depicted in FIG. 12 corresponds approximately to position (H) in FIG. 13.

Before bar (63) completes a whole turn the gyroscope has to make a second complete path about its locus but during the second turn the direction of spin of the gyroscope is opposite to the direction in which it was spinning on the previous turn. The direction of torque demanded by, or that must be applied to, the gyroscope has therefore to be reversed each time the gyroscope passes position (E) in FIG. 13.

From FIG. 13 it will be seen that the motion of the gyroscope is essentially in two parts; first when it is undergoing substantially precessional motion between positions (H) and (B2) corresponding to position (B) but on the second revolution around the axis 'BB' and second when it is undergoing substantially linear translation between positions (D) and (F). In both revolutions the direction of linear translation is in the same direction and will tend to impart a linear cycle of momentum to the vehicle while the motion between positions (H) and (B2), being substantially precessional, develops significantly less momentum.

Combined in the manner described it is possible to provide a cyclic pulse of momentum in the opposite direction to the linear direction of translation of the gyroscope, and provide a smoother propulsion than is provided by an apparatus such as the first embodiment, in which the motion of the gyroscope may be divided into a purely precessional part and a purely translational part.

Just as in an electric circuit, a voltage applied across a resistor causes a current to flow in that resistor, so equally a current of that value being passed through that same resistor will cause a voltage to appear across it, so a torque may be seen as the cause of a precession or conversely that precession may be seen as the cause of a torque. This is of especial significance with respect to the third embodiment of the invention.

Generally, the operation of the gyroscope unit of the third embodiment will now be explained with reference to FIG. 15. In that Figure, a gyroscope (M) is precessed around a horizontal circle, the torque on the gyroscope being provided along a radius of that circle, and the axis of spin of the gyroscope at all times being tangential to that circle, the wheel subsequently being returned along a path which lies in the plane of the wheel.

The operation of the third embodiment of the present invention can be understood by considering the arrangement of FIG. 15 in a situation of zero gravity and ignoring, for the present, the fact that any torque in one direction is only produced as the result of an equal torque in the opposite direction. In operation, the torque motor twists the shaft (R) which causes the wheel (M) to precess from A to B in a horizontal plane. This is a precessional stroke. At B the torque is removed and a second return motor, incorporated as part of the pivot (O), drives the shaft (R) in a downward semicircle, between the supporting plates (G, G'), back to A. This is a reaction stroke. If, instead of being precessed from A to B by an applied torque, the wheel were forced round the same path, the torque motor being removed so that the solid shaft were not interrupted, then the wheel would help itself to the amount of torque required to maintain that rate of precession, from the bearings at the pivot (O).

The gyroscope unit of the third embodiment of the present invention is shown in FIG. 16. The unit has a horizontal base plate which rotatably supports a horizontal turntable which is free to rotate about a vertical axis through its centre. A motor is provided to rotate the turntable relative to the base. A pair of parallel-spaced substantially triangular plates extend vertically upwardly from the turntable. A horizontal lower bevelled gear is disposed directly above the centre of the turntable and is carried in between the two upwardly extending plates. The lower bevelled gear is fixed against rotation relative to the base plate. An upper vertical bevelled gear is pivotally mounted between the uppermost ends of the upwardly extending plate. The upper bevelled gear and lower bevelled gear are of equal size and are arranged to mesh with one another. A pendulum shaft is carried in plane parallel to the two upwardly extending plates by the upper bevelled gear. The free end of the pendulum shaft is provided with a fork which is arranged to rotatably support the gyroscope wheel.

The bevel gears of the third embodiment enable the precession and reaction strokes to be geared together, such that, for rotation of the support plates (G, G') fixed to turntable (J) with respect to the baseplate (H), the shaft (R) carrying the wheel is rotated by the same amount, using the bevel gears (at O) in place of the return motor shown in FIG. 15. Hence, the gyroscope unit of the third embodiment of the present invention is driven by a single motor so that for every 180° of precession in the horizontal plane it performs 180° of reactive rotation in the vertical plane.

The resultant motion may now be seen to take place entirely within the space ABCDEFGH of the theoretical circumscribing box and, as above in FIG. 16, never enters the other half of the box at all.

Looking in plan, i.e. downward on plane ABCD, the motion of the wheel is seen to be as in FIG. 18. In the parts of the path in the lowermost half of that Figure, precession dominates and mass transfer is taking place, whereas, in the parts of the path in the uppermost half non-precession dominates and a reaction force is developed.

FIG. 19 shows the elevation as viewed into plane ABFE for a full 360° of rotation the turntable. The torque demanded at the centre point is seen to alternate between one half rotation and the next.

FIG. 20 shows the elevation as viewed into plane ADHE. In addition to the alternating torque required, there are seen to be alternating reaction forces parallel to AE and BF which do not therefore contribute to propulsion of the vehicle.

These forces along with the torque which has to be provided by the base (H) may be cancelled out by additional similar arrangements in mirror image.

On the other hand, FIG. 19 shows that the forces parallel to AB and EF do not cancel but instead combine to drive the base in one direction. The cancellation on one axis and supplementation on another at right angles to it is a fundamental property of three dimensional space and is also exemplified by the use of the left and right hand rules of electromagnetic theory.

In order to cancel the actual torque developed in driving the wheel on the turntable (J) round the baseplate (H) an identical turntable may be mounted alongside on the same baseplate with the second wheel occupying the space DCJI-HGKL (allowing such additional space as might be required for clearance). The two wheels spin in the same direction when adjacent but are driven in mirror image paths by equal and opposite torques from the same motor resulting in no net torque on the vehicle.

Similarly this pair of wheels develop a net torque in the plane DCGH against the baseplate which may be cancelled by another pair of identical wheels mounted immediately beneath the first pair, again as a mirror image of them. The four wheels may then be driven by a single motor so mounted that it is free to rotate on baseplate (H) and all its power is absorbed by the losses in one pair of wheels being exactly equal to the losses in the second pair while the sum of these losses is supplied by the motor(s) typically though not exclusively when the gyroscope units illustrated in FIG. 16 are arranged together as in FIG. 17.

In the fourth embodiment of the invention FIG. 21 shows a frame F on which is mounted a turntable T capable of being rotated with respect to F by a motor M. A motorised gyroscopic means G, which may be similar to that described in relation to FIG. 10 below, is rigidly mounted in a carrier B. This carrier is located by flanged wheels S in turntable T so hat it is free to rotate about an axis E normal to the plane of the turntable but will be carried round by the turntable. The axis E is substantially at right angles to the axis of rotation of the gyroscopic means G. An actuator A is fitted in such a manner as to be able to operate a clamp C and prevent the free rotation of the gyroscopic means and its carrier with respect to the turntable.

In operation, the gyroscopic means is first supplied with power and allowed to reach its designed operating rotational speed. The motor M is energised causing the turntable to rotate. At Π the actuator is activated clamping the frame B to the turntable and causing the gyroscopic means thereby to be forcibly precessed through an arc of 180°. At 2Π the actuator is released so that the frame B is free to rotate while the turntable continues turning a further 180° back to Π without stopping. The actuator is again energised and the cycle repeated.

During the first half of the cycle just described the force acting upon the gyroscopic means to maintain it in the prescribed arc is less than that calculated were the gyroscope means a simple non rotating object of the same mass. During the second half of the cycle the full calculated force is required. Thus the relative movement of the effective centre of mass of the whole apparatus with respect to the frame F takes place with a fraction of the reaction upon the frame during the first half cycle F compared to the reaction upon the frame during the second half cycle, resulting in an overall transfer of mass in direction P.

In practice the torque developed by the gyroscopic means on the carrier B has to be provided by an identical inverted turntable complete with an identical counter rotating gyroscopic means, carrier, actuator and clamp, both turntables driven by the same motor. The net torque required to maintain rotation of the turntables as just described and the angular momentum developed when the carrier(s) B are clamped is supplied from an identical mirror image pair of turntables such as the arrangement illustrated in FIG. 22. Such an apparatus as illustrated in FIGS. 21 and 22 or those described in the following FIGS. 23 to 28 inclusive are not necessarily limited to one gyroscopic means per turntable and a number of such gyroscopic means might be attached symmetrically to each turntable provided that the arrangement is repeated for reflecting and balancing turntables.

For clarity, each gyroscopic means thus far described has been considered to consist of a simple, single, motorised bearing with a massive outer rim. However, if the mass of the rotating part of each gyroscopic means is concentrated in a 'thin' rim, to the extend indeed that the entire centre of the gyroscopic means were absent, the theoretical gyroscopic effectiveness of such mass would be increased. If an identical rim, revolving in the opposite direction, be mounted alongside the first rim, the torque required to cause one rim to precess would always balance that required by the second rim. Furthermore the forces required to develop this torque are provided at either end of a diameter where they are needed and not through the shafts, hubs and webs, thereby concentrating the highly stressed sections to two compact zones with reduced risk and lower weight penalty.

FIG. 23 is a simple perspective sketch of such an arrangement where G and G' are the two rim-only gyroscopic means, M is a common motor driving both rims and mounted within the enveloping carrier B to which are fixed a series of rotating supports R that locate the rims. The carrier B is here shown with flanged wheels S to mount this unit into a turntable as described in the fourth embodiment and illustrated in FIG. 24.

FIGS. 25 and 26 show two arrangements of the fifth and fourth embodiments so combined as to illustrate that mass transfer may be derived from the difference in centrifugal force between rapidly spinning masses being precessed and being swung round an arc without precession as firstly
a) in FIG. 25 by arranging for the effective mass transfer P and P' of two identical counter rotating systems to cancel and combining the effective difference of resultant centrifugal forces C and C' or as secondly b) in FIG. 26 by summing the effective mass transfer P and P' and arranging for the effective centrifugal forces C and C' to cancel.

FIGS. 27 and 28 show the fifth embodiment combined with the fourth embodiment turned through 90°0 at the start of the cycle to indicate that the claim to mass transfer does not rely in particular to the relative angle the fifth embodiment may have with respect to the fourth embodiment at the commencement of a cycle provided that an arc of precession of approximately 180° is followed by a further arc of 180° without precession whereby the transfer of the mass of the gyroscopic means is transmitted to the vehicle.

In other words, the purpose of FIGS. 27 and 28 is to clarify the claim that mass transfer is achieved is not limited to any one initial attitude of the fifth embodiment with respect to the fourth embodiment but may apply to any attitude provided that the axis E is substantially normal to the plane of mass transfer and, by definition, is substantially parallel to the axis of precession.

Notwithstanding the use of 'single gyroscopic means' being described in each of the preceding three other embodiments of the invention, the 'twin gyroscopic means' of the fourth embodiment may be substituted for the appropriate pairs of single gyroscopic means in each of the former embodiments.

It will be seen how the present invention provides a propulsion system which does not necessitate the carriage of volatile fuel and which need not accelerate the vehicle in a conventional sense since it ceases to move the vehicle when it is inactive. Furthermore, it will be seen how the propulsion system may be powered by a renewable energy source such as stellar radiation or may be powered by a deliberately focused distant energy source such as a microwave power beam.

We claim:

1. A method of moving a vehicle in a first direction, said method comprising the steps of:
    connecting a gyroscope to said vehicle;
    causing said gyroscope to follow a path which involves at least one precession-dominated portion and at least one translation-dominated portion,
    wherein in the precession-dominated portion, the mass of the gyroscope moves in the said first direction and an associated first movement of the vehicle in substantially the opposite direction to said first direction occurs, and, in the translation-dominated portion, the mass of the gyroscope moves with an associated second movement of the vehicle in substantially said first direction,
    wherein said second movement is greater than said first movement and hence the vehicle moves in said first direction.

2. A method according to claim 1, including operating the vehicle in a gravitational field providing the torque required for the precession of the gyroscope.

3. A method according to claim 1, including providing at least one other gyroscope to provide the torque required for the precession of the first-mentioned gyroscope.

4. A method according to claim 1, providing at least one other gyroscope precessing in the opposite direction relative to the first-mentioned gyroscope to provide the linear momentum required by the first-mentioned gyroscope in order to precess about an axis remote from its center.

5. A method according to claim 1, including causing the gyroscope to follow said path such that motion of the gyroscope varies continuously between a substantially entirely precessional motion and a substantially entirely translational motion thereby providing a smooth propulsion to the system.

6. A method according to claim 1, wherein a plurality of groups of gyroscopes are provided, and operating the groups to impart said second movement to the vehicle at different times so as to provide a smooth propulsion.

7. A method according to claim 1, wherein the precession-dominated portion and the translation-dominated portion comprise successive portions of a cycle and repeating said cycle to continue movement of the vehicle in the first direction.

8. A method according to claim 1, including providing a high proportion of the mass of the gyroscope in a plane at right angles to the spin axis of said gyroscope and at a predetermined distance from said spin axis of said gyroscope.

9. A method according to claim 1, including maximizing the ratio of the angular velocity of the gyroscope about its spin-axis to the angular velocity of said precession.

10. An apparatus for moving a vehicle in a first direction, comprising:
    a support structure carried by the vehicle;
        at least one gyroscope carried by said support structure for precessional motion about an axis remote from a center of said gyroscope;
        means for causing the gyroscope to follow a path involving at least one precession-dominated portion and at least one translation-dominated portion;
        the mass of the gyroscope, in the precession-dominated portion, moving in said first direction with an associated first movement of the vehicle in substantially the opposite direction, and the mass of the gyroscope, in the translation-dominated portion, being moved with an associated second movement of the vehicle in substantially said first direction;
        said second movement being greater than said first movement thereby moving the vehicle in said first direction.

11. An apparatus according to claim 10, wherein the means for causing the gyroscope to follow said path comprises at least one other gyroscope carried by said support structure which provides the torque required in the precession-dominated portion of said path.

12. An apparatus according to claim 10, wherein the means for causing the gyroscope to follow said path comprises means for providing said gyroscope with the linear momentum required for the gyroscope to precess about an axis remote from the center of the gyroscope.

13. An apparatus according to claim 12, wherein the means for providing the required linear momentum is provided by at least one other gyroscope.

14. An apparatus according to claim 10, further comprising a means for rotating the gyroscope.

15. An apparatus according to claim 10, wherein the gyroscope comprises two counter-rotating annuli retained in a carrier means.

16. An apparatus according to claim 10, wherein a plurality of gyroscopes are provided and arranged such that the torque required to spin the gyroscopes cancel one another.

17. An apparatus according to claim 10, wherein the gyroscope comprises a substantially annular rim, and the means for rotating the gyroscope acts upon said rim.

18. An apparatus according to claim 10, wherein the rim is rotatably supported by a plurality of supports angularly spaced about said rim.

* * * * *